(12) United States Patent
Park et al.

(10) Patent No.: US 12,035,046 B2
(45) Date of Patent: Jul. 9, 2024

(54) IMAGE SIGNAL PROCESSOR FOR PERFORMING AUTO ZOOM AND AUTO FOCUS, IMAGE PROCESSING METHOD THEREOF, AND IMAGE PROCESSING SYSTEM INCLUDING THE IMAGE SIGNAL PROCESSOR

(71) Applicant: Samsung Electronics Co., Ltd., Suwon-si (KR)

(72) Inventors: Kichrl Park, Hwaseong-si (KR); Sangmin Kim, Yongin-si (KR); Heeshin Kim, Hwaseong-si (KR); Yonggu Lee, Seoul (KR); Jeongwook Lee, Suwon-si (KR); Kilwoo Chung, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 64 days.

(21) Appl. No.: 17/668,434

(22) Filed: Feb. 10, 2022

(65) Prior Publication Data

US 2022/0279127 A1    Sep. 1, 2022

(30) Foreign Application Priority Data

Feb. 26, 2021 (KR) .................. 10-2021-0026801

(51) Int. Cl.
*H04N 23/69* (2023.01)
*H04N 23/62* (2023.01)
*H04N 23/959* (2023.01)

(52) U.S. Cl.
CPC ............. *H04N 23/69* (2023.01); *H04N 23/62* (2023.01); *H04N 23/959* (2023.01)

(58) Field of Classification Search
CPC ...... H04N 23/69; H04N 23/62; H04N 23/959; H04N 23/67; H04N 25/705; H04N 13/271; H04N 23/54; H04N 23/57
See application file for complete search history.

(56) References Cited

U.S. PATENT DOCUMENTS 5,331,176 A * 7/1994 Sant' Anselmo .. G06K 7/10881
235/462.1
8,654,195 B2   2/2014 Ishiyama et al.
(Continued)

FOREIGN PATENT DOCUMENTS

JP        2014-007516 A    1/2014
KR   10-2014-0011215 A    1/2014
KR   10-2019-0021138 A    3/2019

*Primary Examiner* — Christopher K Peterson
(74) *Attorney, Agent, or Firm* — Harness, Dickey & Pierce, P.L.C.

(57) ABSTRACT

An image signal processor may be configured to process an image based on simultaneously performing auto zoom and auto focus. An image signal processor may be configured to receive a first image from an image sensor may include processing circuitry configured to determine auto focus information on an object in the first image using a depth map, set a first area based on calculating a first outer point and a second outer point associated with the object using the depth map, set a second area based on a particular ratio that is determined based on the first outer point and the second outer point, and determine auto zoom information based on calculating a zoom ratio corresponding to a size of the second area.

20 Claims, 14 Drawing Sheets

(56) References Cited

U.S. PATENT DOCUMENTS

| | | |
|---|---|---|
| 8,947,560 B2 | 2/2015 | Hiratsuka et al. |
| 8,971,662 B2 | 3/2015 | Fukata et al. |
| 9,317,196 B2 | 4/2016 | Fong et al. |
| 11,025,814 B2 | 6/2021 | Lee et al. |
| 2012/0242796 A1* | 9/2012 | Ciurea .................. H04N 23/62 348/46 |
| 2013/0328918 A1* | 12/2013 | Okamura ................ G06T 7/254 345/625 |
| 2014/0022351 A1 | 1/2014 | Cho et al. |

* cited by examiner

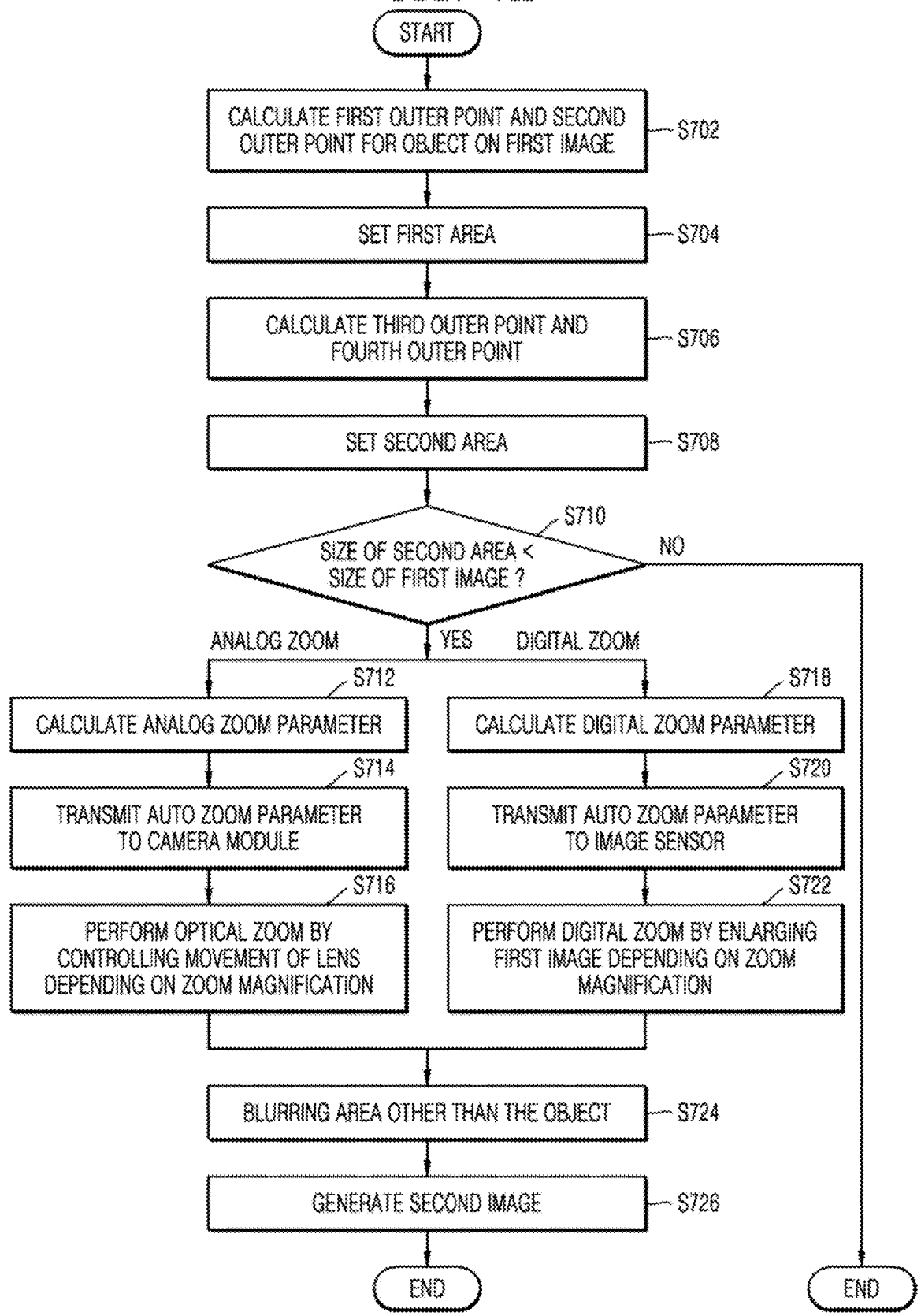

IMAGE SIGNAL PROCESSOR FOR PERFORMING AUTO ZOOM AND AUTO FOCUS, IMAGE PROCESSING METHOD THEREOF, AND IMAGE PROCESSING SYSTEM INCLUDING THE IMAGE SIGNAL PROCESSOR

CROSS-REFERENCE TO RELATED APPLICATIONS

This application is based on and claims priority under 35 U.S.C. § 119 to Korean Patent Application No. 10-2021-0026801, filed on Feb. 26, 2021, in the Korean Intellectual Property Office, the disclosure of which is incorporated by reference herein in its entirety.

BACKGROUND

At least one example embodiment of the inventive concepts relates to image processing, and more particularly, to an image signal processor capable of simultaneously performing auto zoom and auto focus, a processing method of the image signal processor, and an image processing system including the image signal processor.

An image signal processor provided in an imaging device such as a camera or a smart phone may process an image provided from an image sensor to generate a converted image. In order to obtain a 3D image using an image sensor, it is necessary to obtain not only color information but also information about a distance between an object and an image sensor, for example, a depth map. The depth map including information related to the distance from the user's viewpoint on a 2D image to the surface of scene objects may be extracted using a plurality of cameras and, for example, a phase detection auto focus (PDAF) sensor.

When a user wants to photograph a nearby object using an imaging device, after touching the screen of the imaging device with the object positioned in the center of the screen, the user manually performs zooming in or zooming out several times to adjust the angle of view. Then, after completing zooming and focusing, the user takes pictures. When focusing is performed after zooming is completed, it is difficult to accurately focus because the number of phase-difference detection (PD) pixels of the image sensor is reduced in a zoomed state.

SUMMARY

The problem to be solved by at least one example embodiment of the inventive concepts is to provide an image signal processor capable of processing an image by simultaneously performing auto zoom and auto focus, an image processing method of the image signal processor, and an image processing system including the image signal processor. At least one embodiment may provide a method of capturing a clear image in a simpler way by simultaneously zooming and focusing by a single touch of a user and automatically setting a zoom area.

An apparatus according to at least one example embodiment may include processing circuitry configured to receive a first image from an image sensor, determine auto focus information with respect to an object in the first image using a depth map, set a first area based on calculating a first outer point and a second outer point associated with the object using the depth map, set a second area based on a particular ratio, the particular ratio being determined based on the first outer point and the second outer point, and determine auto zoom information based on calculating a zoom ratio corresponding to a size of the second area.

An image signal processing method of an image signal processor according to at least one example embodiment may include: calculating a first outer point and a second outer point based on an object in a first image using depth map information; setting a first area using the first and second outer points; calculating auto zoom information to cause a second image to be output, the second image corresponding to a second area depending on a particular ratio determined based on the first outer point and the second outer point is output; and calculating auto focus information associated with the object in the first image using the depth map information, wherein the calculating of the auto zoom information and the calculating of the auto focus information are performed simultaneously.

An image processing system according to at least one example embodiment may include a camera device including an image sensor configured to transmit a first image; and processing circuitry configured to receive the first image from the image sensor, calculate an auto focus parameter for an object in the first image using a depth map, set a first square based on the object included in the first image using the depth map, set a second square based on a ratio, the ratio being determined based on the first square, and calculate an auto zoom parameter for a second image corresponding to the second square in response to a determination that the second square is smaller than the first image.

BRIEF DESCRIPTION OF THE DRAWINGS

Example embodiments of the inventive concepts will be more clearly understood from the following detailed description taken in conjunction with the accompanying drawings in which:

FIG. 7A is a flowchart illustrating a method of performing auto zoom according to some example embodiments of the inventive concepts;

DETAILED DESCRIPTION

Hereinafter, some example embodiments of the inventive concepts will be described in detail with reference to the accompanying drawings.

Figure 1:
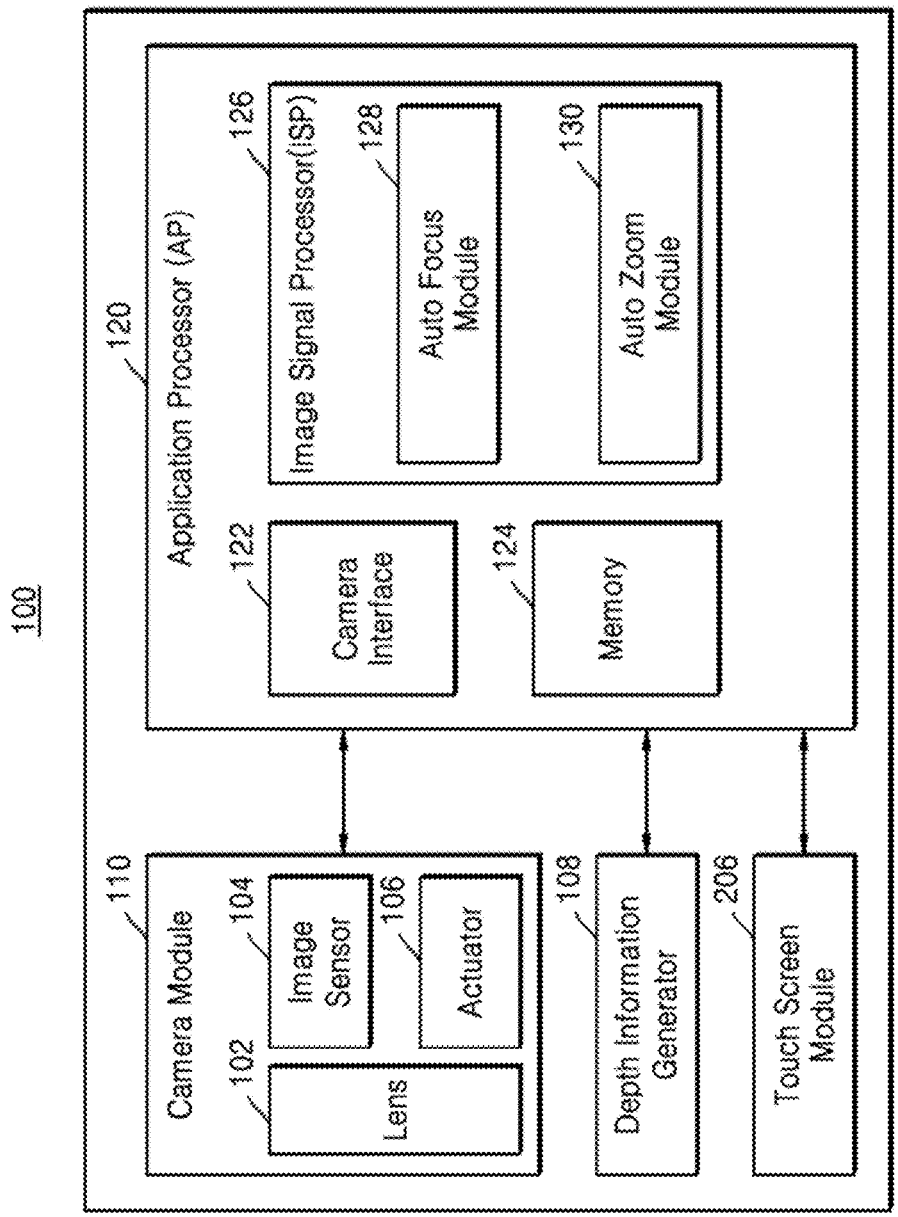
FIG. 1 is a block diagram illustrating an electronic device processing an image signal according to some example embodiments of the inventive concepts.

FIG. 1 is a block diagram illustrating an electronic device processing an image signal according to some example embodiments of the inventive concepts. As described herein, the electronic device may be interchangeably referred to as an "apparatus."

An electronic device according to some example embodiments of the inventive concepts may be implemented as, for example, a personal computer (PC), an Internet of Things (IoT) device, or a portable electronic device. The portable electronic devices include laptop computers, mobile phones, smartphones, tablet personals (PCs), personal digital assistants (PDAs), enterprise digital assistants (EDAs), digital still cameras, digital video cameras, audio devices, portable multimedia devices (PMPs), personal navigation devices (PNDs), MP3 player, handheld game consoles, e-books, wearable devices, and the like.

Referring to FIG. 1, the electronic device 100 may include a camera module 110 and an application processor (AP) 120.

The camera module 110 (which may be referred to interchangeably herein as a camera device) may include at least one lens (e.g., lens 102), an image sensor 104 and an actuator 106 (e.g., a servomotor). The lens 102 may be moved to a specific position by the actuator 106, and the image sensor 104 may sense an image of a sensing target using light provided through the lens. The actuator 106 (e.g., a servomotor) may be configured to control a movement of the lens 102 based on (e.g., according to) auto zoom information (e.g., an auto zoom parameter) received at the camera module 110.

The image sensor 104 may convert an optical signal of a subject incident through the optical lens into an electrical signal or an image (i.e., image data). The image sensor 104 may include, for example, a pixel array including a plurality of pixels arranged two-dimensionally and a sensing circuit, and the pixel array may convert received optical signals into electrical signals. The pixel array may be implemented as a photoelectric conversion device such as, for example, charge coupled device (CCD) or complementary metal oxide semiconductor (CMOS), and may also be implemented as various types of photoelectric conversion devices. The sensing circuit may convert an electrical signal provided from the pixel array into an image and output (e.g., transmit) the converted image, which may be referred to herein as a first image. The image sensor 104 may be implemented as a semiconductor chip including the pixel array and the sensing circuit.

The application processor 120 may be included in an apparatus that is included within the electronic device 100 and includes or is separate from at least other portions of the electronic device 100, including without limitation the camera module 110. The application processor 120 may be communicatively connected to a depth information generator 108, also referred to herein as a depth map generator. Depth information (e.g., a depth map) may be defined as a distance from an image sensor or from an observation point to an object surface and information related to the distance. The depth information generator 108 may include at least one of a phase detection auto focus (PDAF) sensor, a time of flight (TOF) sensor, or a light detection and ranging (LiDAR) sensor. A PDAF (phase detection auto focus) sensor may be defined as a sensor having a function of focusing a subject by using a phase difference (i.e., an image difference) extracted from a phase detection (PD) pixel inside an image sensor. The TOF sensor may be defined as a sensor that has a function of recognizing the distance to a target object by calculating the round trip time taken when a photon moves from the sensor to the object and vice versa. The LiDAR sensor may be defined as a sensor capable of detecting a distance and direction to an object by illuminating a laser on an object.

As some example embodiments, a depth map may be generated by the application processor 120. The application processor 120 may generate a depth map based on receiving a signal from a phase detection (PD) pixel of the image sensor 104. In some example embodiments, as illustrated in FIG. 1, the depth information generator 108 including the PDAF sensor, TOF sensor, and/or LiDAR sensor may generate and provide the depth information using distance information obtained through sensing and provide the depth information to the application processor 120, and based on this, the application processor 120 may generate a depth map.

In some example embodiments, the depth map may be generated by the image sensor 104. In the case of the image sensor 104 including a phase detection (PD) pixel, the image sensor 104 may generate the depth map based on a signal from the PD pixel of the image sensor. In some example embodiments, the depth information generator 108 including the PDAF sensor, TOF sensor, and/or LiDAR sensor may generate depth information using distance information obtained through sensing and provide the depth information to the image sensor 104, and the image sensor 104 may generate the depth map. In this case, the depth information generator 108 may be communicatively connected to the camera module 110.

Accordingly, it will be understood that the depth information generator 108 may be configured to provide depth information to the image sensor 104 and/or the application processor 120. It will be understood that the depth information provided by the depth information generator 108 may be associated with an image (e.g., a first image) that is generated and transmitted by the camera module 110. For example, the depth information generator 108 may generate the depth information in response to the image sensor 104 generating the first image.

By using the depth information generator 108 having an improved multi-point capability that distinguishes between near and far distances, an area including an object desired by a user may be accurately and quickly obtained. Throughout the specification, an object and an object may be used as terms indicating an object to be photographed by a user.

In some example embodiments, the application processor 120 may include a camera interface 122, a memory 124, and an image signal processor 126. The application processor 120 may control the overall operation of image processing, and may be implemented as a system on chip (SoC) that drives an application program, an operating system, and the like. The application processor 120 may convert or process image data provided from the camera module 110 through the image signal processor 126 and provide it to the touch screen module 206 including the display device or store it in the memory 124. The application processor 120 may receive an image (or depth map) from the image sensor 104 through the camera interface 122.

The image signal processor 126 may process an image (e.g., a first image) provided from the image sensor 104 (e.g., received from the image sensor 104) to generate a converted image (e.g., a second image). In some example embodiments, an area set by a user's touch input through the touch screen module 206, that is, an image displayed on the touch screen module 206 at the moment the user's touch input is input may be defined as the first image. An image corresponding to an area to be finally output to the user based on the first image may be defined as the second image.

For example, the image signal processor 126 may process an image based on a set white balance, a parameter, and a color space. The converted image may be a color space image such as RGB or YUV. A size of the converted image, e.g., a resolution, may be the same as the image before conversion (e.g., the first image). The converted image may be stored in the memory 124. The memory 124 may be a volatile memory such as a dynamic random access memory (DRAM) or a static RAM (SRAM), or a non-volatile memory such as a phase change RAM (PRAM), a resistive RAM (ReRAM), or a flash memory. The converted image stored in the memory 124 may be used for image signal processing later or may be stored in a storage device.

According to some example embodiments, the image signal processor 126 may include an auto focus module 128 and an auto zoom module 130. The auto focus module 128 may determine auto focus information through an image (e.g., first image) received from the image sensor and the depth map. The auto focus information may be auto focus information with respect to (e.g., associated with) an object in the image received from the image sensor 104. The auto focus module 128 may determine the auto focus information based on using a depth map (e.g., a depth map generated based on depth information provided by the depth information generator 108). The auto focus information may be defined as information used for an auto focusing function, and may include, for example, the position of the focus, the direction of the focus, and/or the distance between the object and the image sensor 104 in which the signal intensities of two phase detection signals included in a pair of detection signals through the phase difference calculation coincide. In some example embodiments, the auto focus information may be and/or may include a parameter used for the auto focus function. Restated, the auto focus information may include, and may be interchangeably referred to herein as, an auto focus parameter The image signal processor 126 may generate a control signal for controlling the position of the lens 102 to move (e.g., for controlling the actuator 106) based on the determined auto focus information, and may output the control signal to the actuator 106. The auto zoom module 130 may determine auto zoom information through (e.g., based on) an image (or depth map) received from an image sensor. The auto zoom module 130 may determine auto zoom information based on using the same depth map used by the auto focus module 128 to determine auto focus information with respect to the object in the received image. The auto zoom information may be defined as information used for the auto zoom function, and may include, for example, when a user wants to photograph a nearby object using an imaging device, a first outer point and a second outer point based on an object, a size of an adaptive area (e.g., second area), a zoom ratio based on the size of the adaptive area, and the like. According to some example embodiments, the auto zoom information may include parameters used for the auto zoom function. Restated, the auto zoom information may include, and may be interchangeably referred to herein as an auto zoom parameter. Any point on the first image may represent a two-dimensional plane as an x-axis and a y-axis perpendicular to each other, and the first outer point and the second outer point may be defined as coordinates (e.g., (3,3)) consisting of an x-axis value and a y-axis value on the first image. In addition, the first outer point and the second outer point may include minimum and maximum values of x-axis and y-axis components among sampling values of the object. The rectangular area composed of the first outer point and the second outer point may be referred to as a first area throughout the specification, and will be described in detail later in FIG. 6A. The adaptive area refers to an area that is set depending on a certain ratio based on the first area and is finally output to the user, and may be referred to as a second area or a second image throughout the specification, and will be described in detail later in FIG. 6B. In some example embodiments, the rectangular area may be a square area and may be referred to as a first square. In some example embodiments, the adaptive area may be a square area and may be referred to as a second square. The image signal processor 126 may perform analog zoom or digital zoom based on the determined auto zoom information.

The application processor 120 may be communicatively connected to the touch screen module 206. The image signal processor 126 may provide an image or a converted image to the touch screen module 206. The touch screen module 206 may sense a user's touch and may display a received image.

According to the electronic device for processing the image signal shown in FIG. 1, the auto focus function and the auto zoom function may be simultaneously performed by (e.g., based on) using the depth map to set the area including the object to be photographed, thereby automatically setting the zoom area to provide a clear image quickly and easily. For example, the auto focus module 128 and the auto zoom module 130 may operate simultaneously. For example, processing circuitry that implements one or both of auto focus module 128 and/or the auto zoom module 130 may determine the auto focus information and determine the auto zoom information simultaneously.

Some examples may be described using the expressions "connected" and/or "coupled" along with their derivatives. These terms are not necessarily intended as synonyms for each other. For example, a description using the terms "connected" and/or "coupled" may indicate that two or more elements are in direct physical or electrical contact with each other. In addition, the terms "connecting" and/or "coupled" may mean that two or more elements are not in direct contact with each other but still cooperate or interact with each other.

Figure 2:
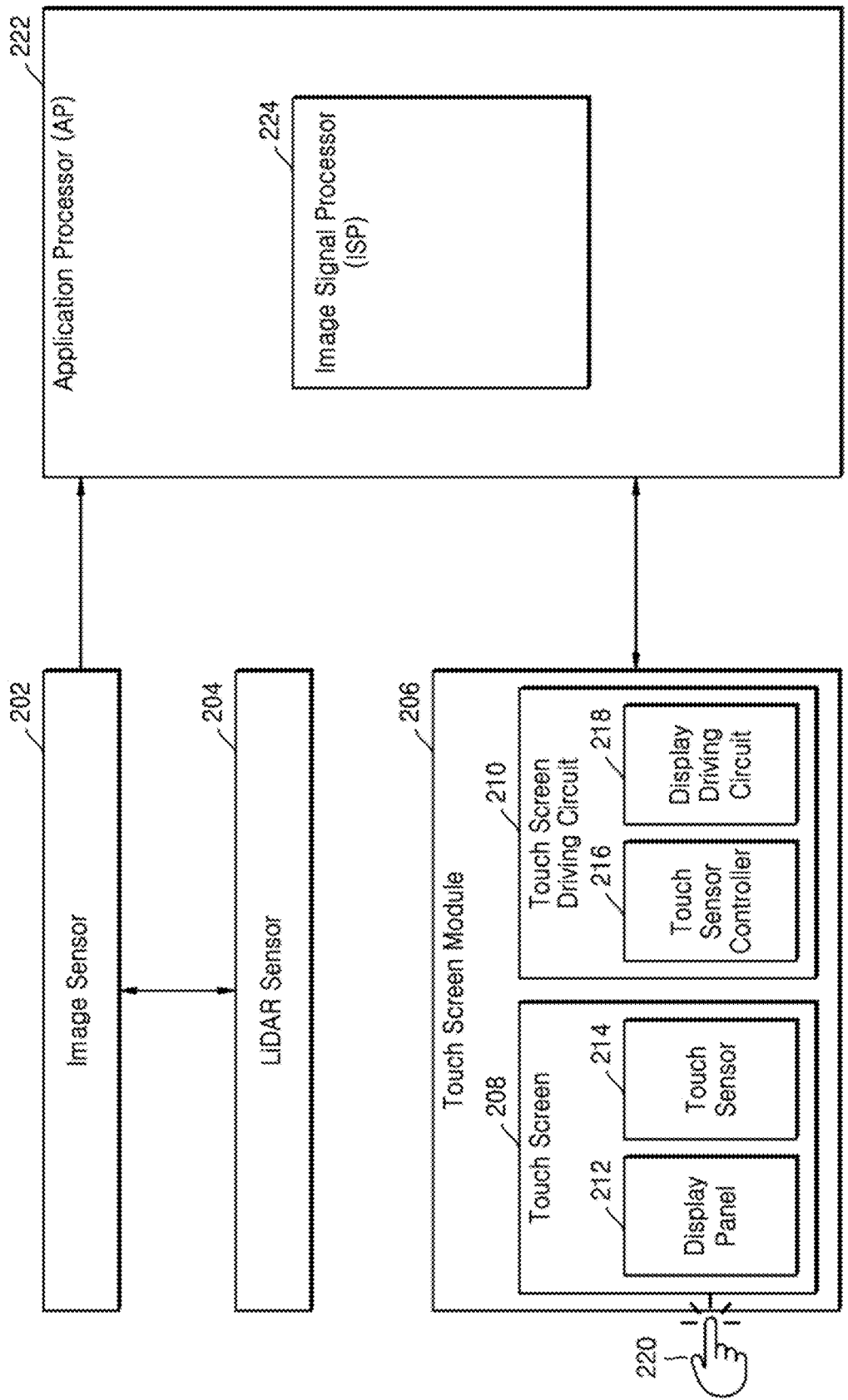
FIG. 2 illustrates a touch screen module and an object recognition method through the touch screen module according to some example embodiments of the inventive concepts.

FIG. 2 illustrates a touch screen module and an object recognition method through the touch screen module according to some example embodiments of the inventive concepts. For convenience of description, an image sensor 202, a LiDAR sensor 204, and the application processor 222 will be shown together.

The touch screen module 206 may include a touch screen 208 and a touch screen driving circuit 210. The touch screen 208 may include a display panel 212 and a touch sensor 214, and the touch screen driving circuit 210 may include a touch sensor controller 216 and a display driving circuit (DDI). The touch sensor controller 216 and the DDI 218 may be integrated on one semiconductor chip or may be separately implemented on a plurality of semiconductor chips. Alternatively, the touch sensor controller 216 and the DDI 218 may be implemented as one semiconductor module.

According to some example embodiments, including the example embodiments shown in FIG. 2, a user 220 may run the camera of the electronic device 100, and the user 220 may touch a user-desired area displayed through the touch screen 208 with a finger or the like. The touch screen 208 may display an image and receive a user's touch (or touch input). The touch screen 208 may operate as an input/output device of an electronic device, and may operate as a proximity sensor that senses an approach of a conductive object. In some example embodiments, the touch screen 208 may further include a fingerprint sensor, and the electronic device including the touch screen module 206 may perform a fingerprint recognition function.

When the touch screen 208 receives a user's touch input, the touch sensor 214 may sense a touch on the touch screen 208 and output sensing signals. In this case, it includes not only direct contact of the conductive object on the touch screen 208 but also the proximity of the conductive object to the touch screen 208. For example, the conductive object may include a user's body (e.g., a finger, a palm, a face, an ear), a touch pen, a stylus pen, and the like. In FIG. 2, the touch sensor 214 and the display panel 212 are illustrated as having separate configurations, but are not limited thereto. The touch sensor 214 may be stacked on the display panel 212 and may be attached to the front surface of the display panel 212 (e.g., a surface from which light signals are emitted). In some example embodiments, the touch sensor 214 may cover the front surface of the display panel 212.

The display panel 212 may be implemented as one of a liquid crystal display (LCD), a light emitting diode (LED) display, an organic LED (OLED) display, an active-matrix OLED (AMOLED) display, an electrochromic display (ECD), a digital mirror device (DMD), actuated mirror device (AMD), a grating light valve (GLV), a plasma display panel (PDP), an electro luminescent display (ELD), or a vacuum fluorescent display (VFD), and may be implemented as another type of flat panel or flexible panel.

The touch sensor controller 216 may scan (e.g., drive and sense) the touch sensor 214. In other words, the touch sensor controller 216 may perform touch sensing. In some example embodiments, the touch sensor controller 216 may convert sensing signals, which are analog signals, into touch values, which are digital signals, and generate touch data including touch values. The touch sensor controller 216 may determine that a touch input has occurred at at least one specific location on the touch screen 208 based on the touch data, and calculate a location where the touch input has occurred, that is, touch coordinates Txy.

The display driving circuit 218 may receive an image from the application processor 222 and drive the display panel 212 so that the image is displayed on the display panel 212.

According to some example embodiments, including the example embodiments shown in FIG. 2, the touch screen module 206 may recognize a user's touch input and calculate a touch coordinate Txy, and the image signal processor 224 may identify an object in a specific image among image data received from the image sensor 202 based on the touch coordinates Txy received from the touch screen module 206. Exemplarily, using the image data and depth map generated by the image sensor 202, or using the image data generated by the image sensor 202 and the depth map generated by the application processor 222, an object desired by a user may be identified.

Figure 3A:
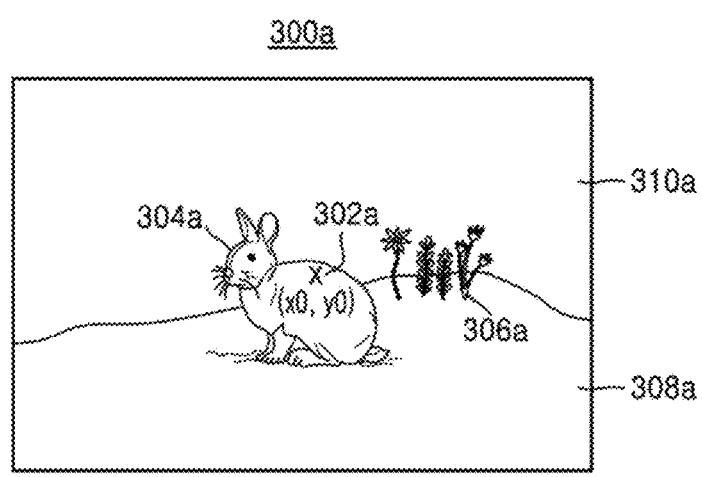
FIG. 3A illustrates an image displayed on the touch screen of FIG. 2 according to some example embodiments of the inventive concepts.
Figure 3B:
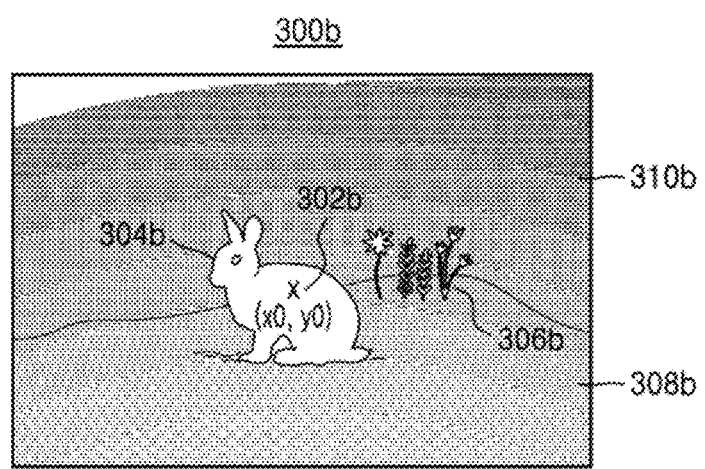
FIGS. 3B to 3C illustrate a depth map and an image separated to identify an object according to some example embodiments of the inventive concepts.
Figure 3C:
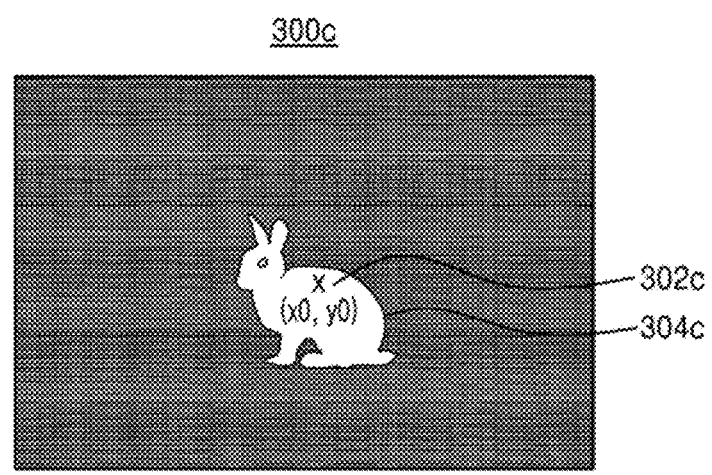

FIG. 3A illustrates an image displayed on the touch screen of FIG. 2 according to some example embodiments of the inventive concepts, and FIGS. 3B to 3C illustrate a depth map and a separated image to identify an object according to some example embodiments of the inventive concepts.

FIGS. 3A to 3C illustrate images and depth maps used in the object recognition method through the touch screen module described in FIG. 2.

Referring to FIG. 3A, the screen displayed on the touch screen 208 may be an area or image 300*a* recognized by a user's touch input. The image 300*a* recognized by the user's touch input corresponds to one of image data provided from the image sensor 104 and may be referred to as a first image.

In some example embodiments, the object to be photographed by the user corresponds to a rabbit 304*a*, and a touch coordinate Txy 302*a* may be defined as (x0, y0). The touch coordinate Txy 302*a* may be located in a center of the image 300*a*. The touch coordinates Txy 302*a* may be calculated through the touch sensor 214 and the touch sensor controller 216. The image 300*a* recognized by the user's touch input may include the rabbit 304*a*, plants 306*a*, a hill 308*a*, and a background 310*a* that is another area.

FIG. 3B illustrates a depth map corresponding to (e.g., associated with) the first image.

The depth map 300*b* may be defined as an image or one channel of an image including a distance from an image sensor or an observation point to an object surface and information related to the distance, and represents depth information of each part of a 2D image. Here, the distance from the user's point of view (or image sensor) to the surface of the objects on the screen may be defined as depth information. The touch coordinate Txy 302*b* may be defined as (x0, y0) in the depth map 300*b* and may correspond to the touch coordinate Txy 302*a* that is defined as (x0, y0) in the image 300*a*.

Each point of the depth map 300*b* may have a unique 3D coordinate based on the depth information and 2D location information of the point. FIG. 3B shows the depth information through contrast. In the depth map 300*b*, the brighter (or closer to white), the smaller the depth value may be defined, and the darker (or closer to black), the greater the depth value may be defined. Referring to FIG. 3B, plants 306*b* on a hill 308*b* may be displayed darker than a rabbit 304*b* because the plants 306*b* are located at a greater distance than the rabbit 304*b* based on the user's perspective. Because a background 310*b* is located at the furthest distance, it may be displayed in black, and the rabbit 304*b* may be displayed in white because it is located at the closest distance.

FIG. 3C shows a third image 300*c* separated by (e.g., based on) using the depth map 300*b* shown in FIG. 3B to identify an object (i.e., rabbit 304*c*). An image of FIG. 3C may be generated by an image signal processor of an application processor, and may be referred to as a third image.

By using the touch coordinate Txy 302*c* and the depth map 300*b* calculated through the touch sensor 214 and the touch sensor controller 216, the image signal processor may obtain depth information at the touch coordinates Txy 302*c*. In addition, the image signal processor may separate an area 304*c* having the same depth information as the depth information in the touch coordinate Txy 302*c*, and may identify the object (i.e., the rabbit 304*c*) of the third image 300*c* (e.g., in the separated area) by (e.g., based on) using a blur characteristic (for example, a point spread function (PSF)) of the first image based on the touch coordinate Txy 302*c*. In some example embodiments, the touch coordinates may be located in the center of the first image, and a third image obtained by separating an area having the same depth map property as a pixel corresponding to the touch coordinates may be generated, for example such that the image signal processor may generate the third image 300c based on separating an area 304c having a same property (e.g., same depth information) as a property of a pixel located in a center of the first image 300a on the depth map 300b (e.g., a pixel corresponding to the touch coordinate Txy 302c that is at the center of the first image 300a). An area having the same depth information may be defined as an area having properties of the same depth map. A point spreading function may be defined as a function that shows how a point spreads mathematically or numerically.

Figure 4:
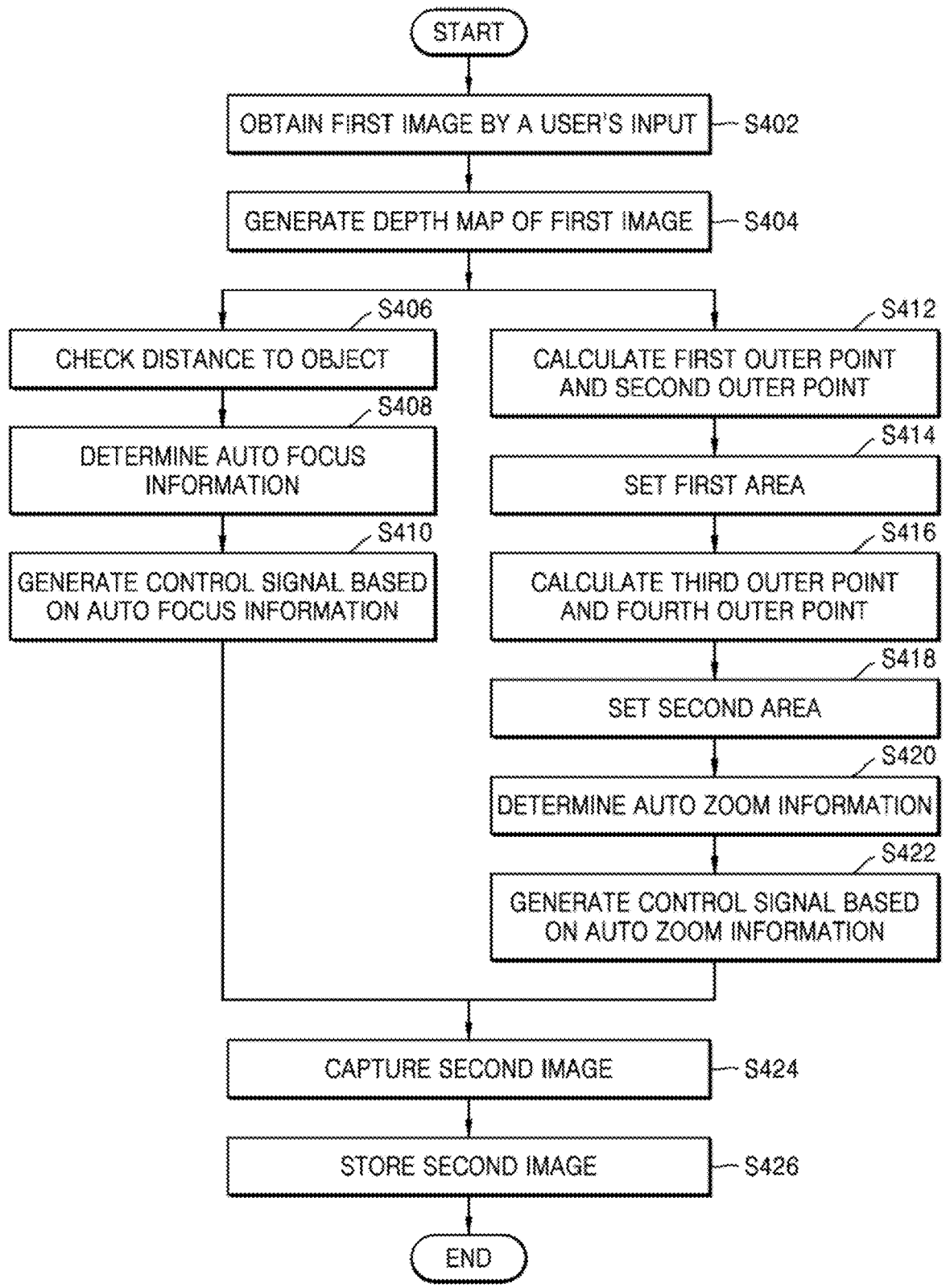
FIG. 4 is a flowchart illustrating a method of processing an image by an electronic device according to some example embodiments of the inventive concepts.

FIG. 4 is a flowchart illustrating a method of processing an image by an electronic device according to some example embodiments of the inventive concepts. The operations of the method shown in FIG. 4 may each be implemented by any one or more of the devices, modules, units, or the like, and/or any portions thereof, according to any of the example embodiments. For example, processing circuitry configured to implement any one or more of the devices, modules, units, or the like, and/or any portions thereof, according to any of the example embodiments may be configured to implement any of operations of the method shown in FIG. 4.

In operation S402, according to some example embodiments of the inventive concepts, light is provided through the lens 102 of the camera module 110, and the image sensor 104 may sense and obtain a first image corresponding to an area set by a user's touch input using light provided through a lens. In operation S404, the image sensor 104 or the application processor 120 may generate a depth map of the obtained first image. The depth map may be generated using depth information, which may be extracted from a depth information generator 108 that may include at least one of a phase detection auto focus (PDAF) sensor, a time of flight (TOF) sensor, or a light detection and ranging (LiDAR) sensor. When the image sensor 104 generates the depth map, the application processor 120 may receive the first image and the depth map through the camera interface 122. The application processor 120 may generate a third image for identifying an object on the first image by using the received first image (or depth map). The object to be photographed by the user may be identified using a point spread function (PSF), as described above with reference to FIG. 3C. The auto focus module 128 and the auto zoom module 130 included in the application processor 120 may receive the first image and the depth map through the camera interface 122.

In operation S406, the auto focus module 128 may check a distance from the image sensor to the object surface on the first image by (e.g., based on) using the depth map, and determine auto focus information (e.g., auto focus parameter) on/for the object on/in the first image (e.g., based on using the depth map) in operation S408. In operation S410, the auto focus module 128 may generate a control signal for controlling to move the position of the lens 102 based on the determined auto focus information. For example, the auto focus module 128 may calculate a parameter for moving the lens based on auto focus information including the position and direction of the focus and distance information between the image sensor and the object, and generate a control signal for transmitting the calculated parameter to the actuator 106.

In operation S412, the auto zoom module 130 may sample the first image and calculate a first outer point and a second outer point based on an object of the sampled first image (e.g., based on using the depth map). The object may be identified on the first image by (e.g., based on) using the depth map (see FIGS. 3A to 3C). Here, it is assumed that (0,0), which is the origin of the coordinates, is located at the upper left vertex of the first image. The first outer point may be defined as coordinates (x1, y1) including the minimum value of the x-coordinate component and the minimum value of the y-coordinate component among the outermost points of the sampled object. The first outer point may be located on the sampled object or may not be located on the sampled object. The second outer point may be defined as coordinates (x2, y2) including the maximum value of the x-coordinate and the maximum value of the y-coordinate among the outermost points of the sampled object. The second outer point may be located on the sampled object or may not be located on the sampled object.

Accordingly, at S412, the first and second outer points may be calculated based on sampling the first image to obtain sampling values of the object in the first image, calculating the coordinates of (e.g., corresponding to) the first outer point (x1, y1) based on a minimum value of an x-axis component (x1) among the sampling values and a minimum value of a y-axis component (y1) among the sampling values such that the minimum value of the x-axis component and the minimum value of the y-axis component correspond to the components of the coordinates corresponding to the first outer point, and calculating the coordinates of (e.g., corresponding to) the second outer point (x2, y2) based on a maximum value of the x-axis component (x2) among the sampling values and the maximum value of the y-axis component (y2) among the sampling values such that the maximum value of the x-axis component and the maximum value of the y-axis component correspond to components of the coordinates corresponding to the second outer point.

In operation S414, the auto zoom module 130 may set a first area having a rectangular shape (e.g., a first square having a square shape) with the first and second outer points as vertices. Thus, the auto zoom module 130 may set the first area based on (e.g., associated with) the object in the first image using the depth map (e.g., based on calculating the first outer point and the second outer point associated with the object in the first image using the depth map).

In operation S416, the auto zoom module 130 may calculate a third outer point and a fourth outer point based on the x-coordinates and the y-coordinates of the first outer point and the second outer point. The coordinates of the third and fourth outer points may be defined as values obtained by multiplying the coordinates of the first and second outer points by a particular (or, alternatively, predetermined) ratio, which will be described in detail later in FIG. 6B.

In operation S418, the auto zoom module 130 may set a second area having a rectangular shape with the third and fourth outer points as vertices. Accordingly, the second area (e.g., second square) may be set based on the certain ratio and on the first outer point and the second outer point. In some example embodiments, the certain ratio may be determined based on the first and second outer points and/or may be determined based on the first area (e.g., first square). The second area may be referred to as an adaptive area or a second image, and may mean an area or an image to be finally output to the user by (e.g., based on) setting an optimal ratio.

In operation S420, the auto zoom module 130 may calculate a zoom ratio based on the first area and the second area (e.g., corresponding to a size of the second area), and may determine auto zoom information on the object on the first image. Accordingly, the auto zoom module 130 may determine (e.g., calculate) the auto zoom information (e.g., auto zoom parameter) based on calculating the zoom ratio corresponding to a size of the second area. In operation S422, the auto zoom module 130 may generate a control signal for controlling analog zoom or digital zoom based on the determined auto zoom information. The control signal may be transmitted to the camera module 110. The camera module 110 may be configured to cause the actuator 106 to move the at least one lens 102 based on the auto zoom information received from the application processor 120 (e.g., processing circuitry implementing the application processor 120).

According to some example embodiments of the inventive concepts, the auto focus module 128 and the auto zoom module 130 may simultaneously operate in parallel after receiving the depth map. An auto focus operation in the auto focus module 128 and an auto zoom operation in the auto zoom module 130 may be terminated together, or one of the two operations may be terminated first. When both the auto focus and auto zoom operations are terminated, the electronic device 100 may capture the second image displayed on the display panel 212 in operation S424, and store the second image in the memory 124 in operation S426.

The electronic device 100 according to some example embodiments of the inventive concepts may perform one-stop operation of automatically selecting an optimal area including the object a user wants to photograph by performing auto focus and auto zoom with a single touch by the user, and capturing and storing an image.

Figure 5:
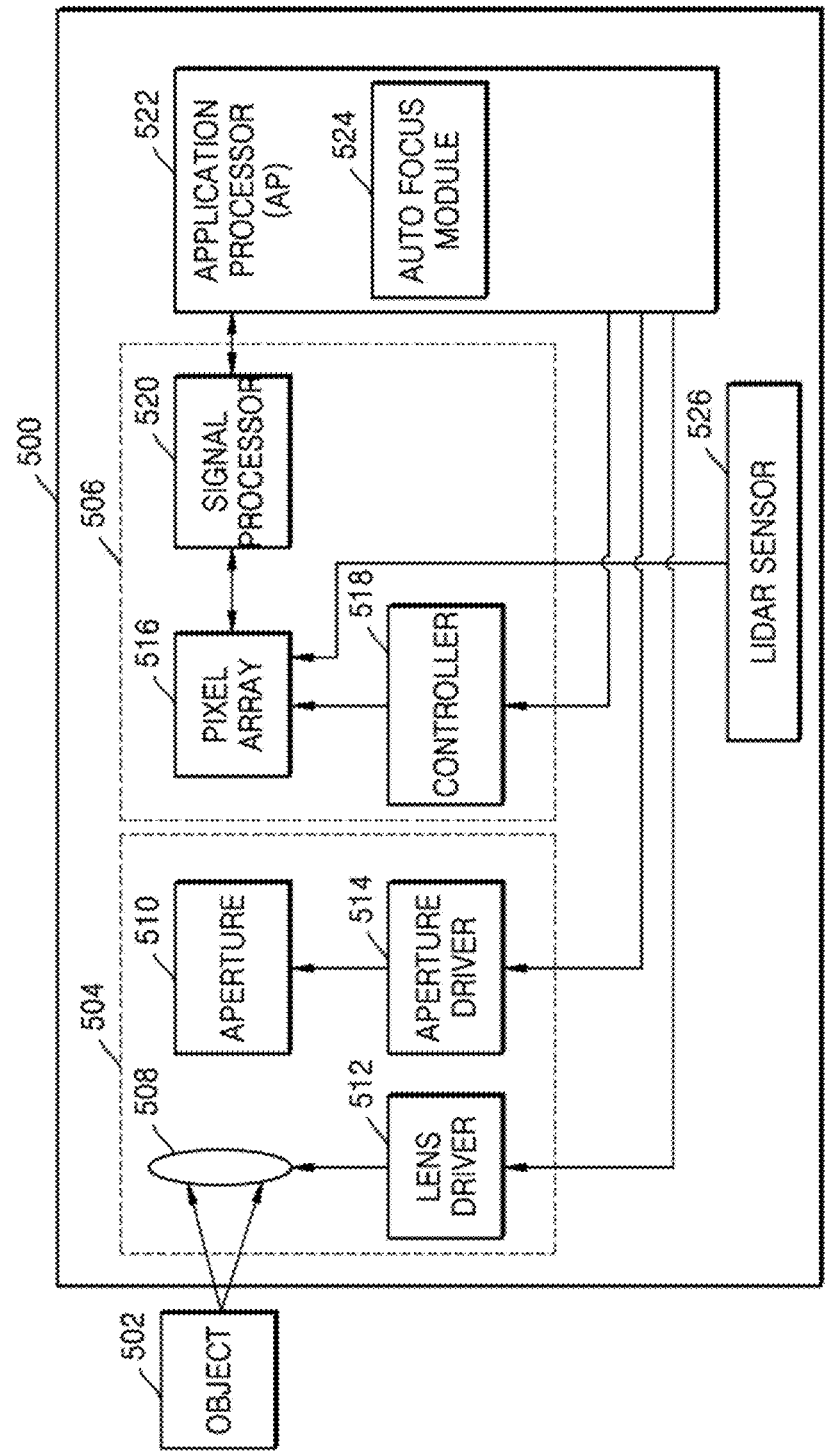
FIG. 5 is a block diagram of an electronic device performing auto focus according to some example embodiments of the inventive concepts.

FIG. 5 is a block diagram of an electronic device performing auto focus according to some example embodiments of the inventive concepts.

An electronic device 500 according to some example embodiments of the inventive concepts may include an imaging unit 504, an image sensor 506, and an application processor 522. The electronic device 500 may have an auto focusing (hereinafter referred to as AF) function.

The application processor 522 may provide a control signal for the operation of each element to a lens driver 512, an aperture driver 514, and a controller 518.

The imaging unit 504 is a component that receives light, and may include a lens 508, a lens driver 512, an aperture 510, and the aperture driver 514. The lens 508 may include a plurality of lenses.

The lens driver 512 may communicate information regarding focus detection with the application processor 522, and may adjust the position of the lens 508 based on the control signal provided from the application processor 522. The lens driver 512 may adjust the position of the lens 508 by moving the lens 508. For example, the lens driver 512 may move the lens 508 in a direction in which the distance from an object 502 increases or decreases, and the distance between the lens 508 and the object 502 may be adjusted. Depending on the position of the lens 508, the object 502 may be focused or blurred.

The image sensor 506 may convert incident light into an image signal. The image sensor 506 may include a pixel array 516, the controller 518 and a signal processor 520. The optical signal transmitted through the lens 508 and the aperture 510 reaches the light-receiving surface of the pixel array 516 to form an image of a subject.

The pixel array 516 may be a complementary metal oxide semiconductor image sensor (CIS) that converts the optical signal into an electrical signal. The sensitivity of the pixel array 516 may be adjusted by the controller 518. The pixel array 516 may include a plurality of pixels arranged in a matrix, and each of the plurality of pixels may include a micro lens and at least two photoelectric conversion elements arranged side by side under the micro lens. Each of the plurality of pixels may include at least one first photoelectric conversion element and at least one second photoelectric conversion element arranged in parallel. The pixel may output a first image signal generated from the first photoelectric conversion element or a second image signal generated from the second photoelectric conversion element. Also, the pixel may output a sum image signal generated from the first photoelectric conversion element and the second photoelectric conversion element. When a pixel included in the pixel array 516 is a PD pixel, the image sensor 506 may generate the depth map using a signal from the PD pixel. As another example, the image sensor 506 or the application processor 522 may generate the depth map by extracting depth information from the depth information generator 108 including the LiDAR sensor 526.

The signal processor 520 may generate a pair of phase detection signals used for a phase difference operation based on the first image signal and the second image signal output from at least two pixels arranged in different adjacent rows and the same column on the pixel array 516 When out of focus, the phases of the first image signal and the second image signal may be different. For example, the signal intensities of the first image signal and the second image signal may be different. When in focus, the phases of the first image signal and the second image signal may be the same.

The signal processor 520 may generate a plurality of phase detection signal pairs based on the plurality of first image signals and the plurality of second image signals output from the pixel array 516. The plurality of phase detection signal pairs or a pair of images generated by the plurality of phase detection signal pairs may be provided to the application processor 522 as auto focus information.

The application processor 522 may include an auto focus module 524. The application processor 522 may receive image data from the image sensor 506. The image data may include an image and/or auto focus information in units of frames. The application processor 522 may perform a phase difference operation for an AF function using the auto focus information. In some example embodiments, the application processor 522 may perform a phase difference operation based on a plurality of phase detection signal pairs included in the auto focus information. For example, the application processor 522 may generate an image A based on a plurality of first phase detection signals among the plurality of phase detection signal pairs and generate an image B based on a plurality of second phase detection signals among the plurality of phase detection signal pairs, and calculate a phase difference between the image A and the image B.

The application processor 522 may obtain a position of a focus where the signal intensities of the two phase detection signals included in a pair of phase detection signals coincide (in other words, the phase of the first image and the second image coincide), a direction of the focus, and/or a distance between the object 502 and the image sensor 506 through the phase difference operation.

The application processor 522 may generate a control signal for controlling the lens driver 512 to move the position of the lens 508 based on the phase difference calculation result, and may output the control signal to the lens driver 512.

Figure 6A:
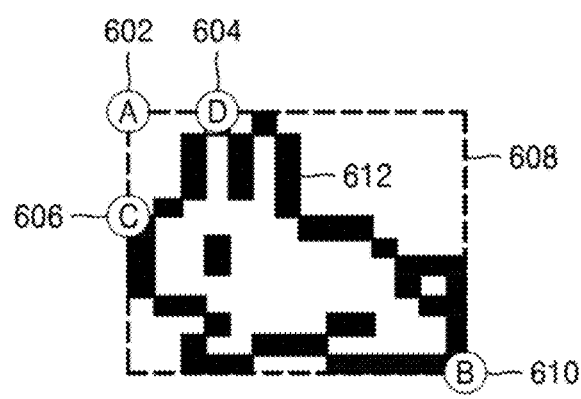
FIGS. 6A to 6B illustrate a first area and a second area set when auto zooming is performed according to some example embodiments of the inventive concepts.
Figure 6B:
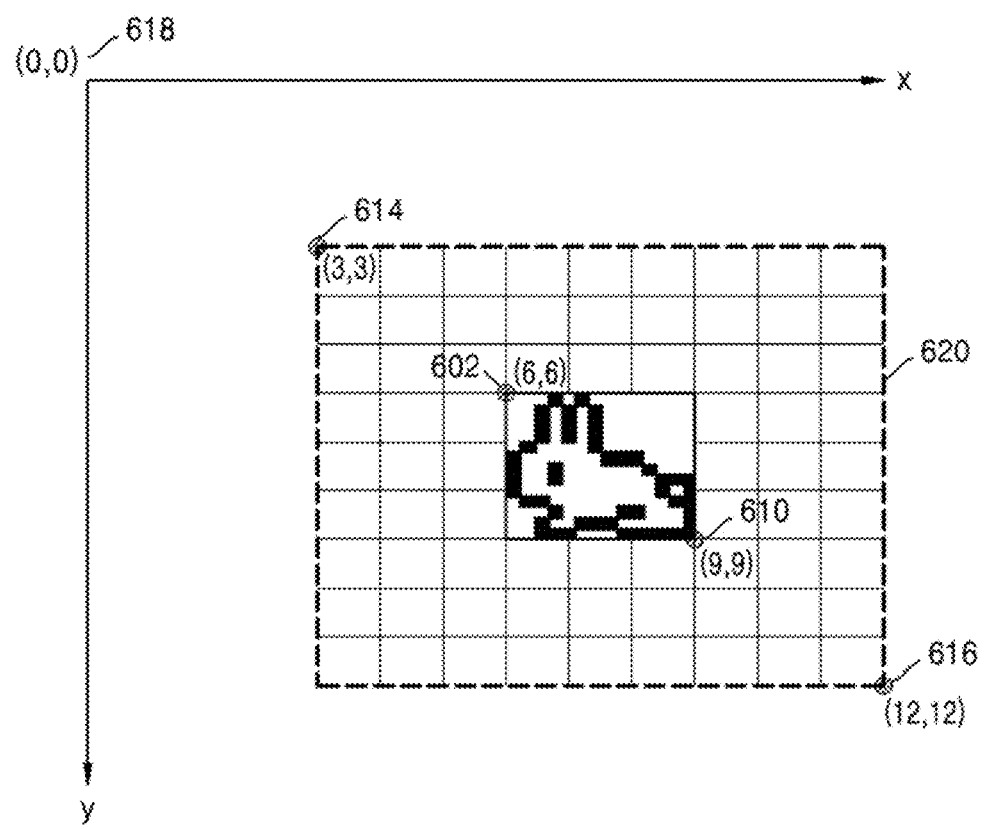

FIGS. 6A to 6B illustrate a first area and a second area set when auto zooming is performed according to some example embodiments of the inventive concepts.

Referring to FIGS. 3A and 6A, the object to be photographed by the user is the rabbit 304a, and the auto zoom module 130 may obtain outermost points 612 of the sampled object by sampling the first image.

FIG. 6A shows a first area 608 set based on an object of the first image sampled as a result of performing the operations S412 to S414 of FIG. 4. For example, the coordinate values of a point C 606 and a point D 604, which are one of the outermost points 612 of the sampled object, may be used to calculate a first outer point (x1, y1) 602. Here, it is assumed that (0,0), the origin of the coordinates, is located at the upper left of the sampled image.

The x-coordinate value x1 of a first outer point 602 may be defined as the minimum value of the x-coordinate among the outermost points 612 of the sampled object, and the auto zoom module 130 may calculate a coordinate value at which the x-coordinate value of the outermost points 612 of the sampled object is the minimum. The outermost point having a coordinate value at which the x-coordinate value is the minimum may be plural, and the x-coordinate value of a point C 606 may be calculated among them. Similarly, the y-coordinate value y1 of the first outer point 602 may be defined as the minimum value of the y-coordinate among the outermost points 612 of the sampled object, and the auto zoom module 130 may calculate a coordinate value at which the y-coordinate value of the outermost points 612 of the sampled object is the minimum. The outermost point having a coordinate value at which the y-coordinate value is the minimum may be a plurality, and the y-coordinate value of a point D 604 may be calculated among them. A first outer point 602 may be set as the x coordinate value of the point C 606 and they coordinate value of the point D 604. According to some example embodiments, the first outer point may not be located on the sampled object. According to some example embodiments of the inventive concepts, because calculation is performed using only the outermost points rather than using all the sampling values of the sampled image, even if the size of the object the user wants to photograph is large, auto zoom may be performed quickly with a relatively small number of calculations.

Similar to the method of calculating the first outer point, one or more of the outermost points 612 of the sampled object may be provided to the operation of the second outermost point (x2, y2) 610.

FIG. 6B shows a second area 620 set based on the first area 608 as a result of performing the operations S416 to S418 of FIG. 4. For example, the calculated first outer point 602 and the second outer point 610 may be used in the calculation of a third outer point (x3, y3) 614 and a fourth outer point (x4, y4) 616. Here, it is assumed that (0, 0) 618, which is the origin of the coordinates, is located at the upper left of the sampled image. In addition, it is assumed that the resolution of the display panel 212 of the touch screen 208 is 4:3. The position of the origin of the coordinates and the resolution of the display panel may have different values, and the scope of the inventive concepts is not limited thereto.

The second area 620 may be set to make an optimal composition based on the first area 608 centered on the object. For reference, the three division method generally used when setting a composition of a screen or dividing a frame is determined by the golden ratio (or golden division) of 1:1.618, and refers to a technique of locating an object to be photographed by a user at a ratio of 1:1.618 when the ratio between the object the user wants to photograph and the background is taken into consideration. Accordingly, the particular ratio used to set the second area 620 may be determined based on a three division method. The three division method may be performed based on the object in the received image.

According to some example embodiments of the inventive concepts, unlike a generally used three division method, a size of the second area may be set by applying a new three division method based on the size of the object without considering the background. Accordingly, the particular ratio used to set the second area 620 may be determined based on a three division method. The three division method may be performed based on the object in the received image. By multiplying the components of the coordinates corresponding to the first outer point by a certain ratio to calculate the components of the coordinates corresponding to the third outer point and multiplying the components of the coordinates corresponding to the second outer point by a certain ratio to calculate the components of the coordinates corresponding to the fourth outer point, the second image may be generated in a simpler way.

An example of source code for calculating the third outer point and the fourth outer point to set the second area 620 is as follows.

```
A(x1, y1), B(x2, y2)
If x1>2 and x2 and y1>2 and y2
Start point(INT {Min(x1)/2}, INT {Min(y1)/2})
End point(INT{Max(x2)*1.3}, INT{Max(y2)*1.3})
Else( )
```

Referring to the source code, point A(x1, y1) 602 may be defined as corresponding to a first outer point, and B(x2, y2) 610 may be defined as corresponding to a second outer point. According to FIG. 6B, it corresponds to A(6,6) and B(9,9). In some example embodiments, in order to set the second area by performing auto zoom after setting the first area, a condition that x1 and y1, which are components of the coordinates corresponding to the first outer point, must be integer values greater than 2 (if x1>2 and y1>2) must be satisfied. Here, because coordinates may be determined in units of pixels disposed on the display, it is assumed that x1 and y1, which are coordinate values of the first outer point, and x2, y2, which are coordinate values of the second outer point, are positive integer values. The reason why the above-described condition is used is that, for example, when the x1 value is 1, which is not greater than 2, the object exists in the outermost part of the first image, and thus corresponds to an image in which auto zoom may not be performed. Because the third outer point for making the second area must be calculated as a positive integer value, it cannot be calculated numerically.

In addition, referring to the source code, the start point may be defined as corresponding to the third outer point, and the end point may be defined as corresponding to the fourth outer point. In some example embodiments, the third outer point may be defined as having a value 0.5 times the coordinates of the components corresponding to the first outer point, and the fourth outer point may be defined as having a value of 1.3 times the values of components of coordinates corresponding to the second outer point. Accordingly, the auto zoom information may be determined based on calculating the third outer point having a value of 0.5 times the components of the coordinates corresponding to the first outer point, calculating a fourth outer point having a value of 1.3 times the components of the coordinates corresponding to the second outer point, and setting the second area using the third and fourth outer points. According to FIG. 6B, it corresponds to the start point (3,3) and end point (12,12). In some example embodiments, when the resolution is 4:3, the optimal ratio is set to values corresponding to the ratios of 0.5 times and 1.3 times for the first and second outer points, respectively, but the example embodiments are not limited to thereto. Accordingly, at S416-418, a second area 620 may be set based on a particular ratio and the first outer point 602 and/or the second outer point 610. The particular ratio may be determined based on the first outer point 602 and/or the second outer point 610.

Figure 7B:
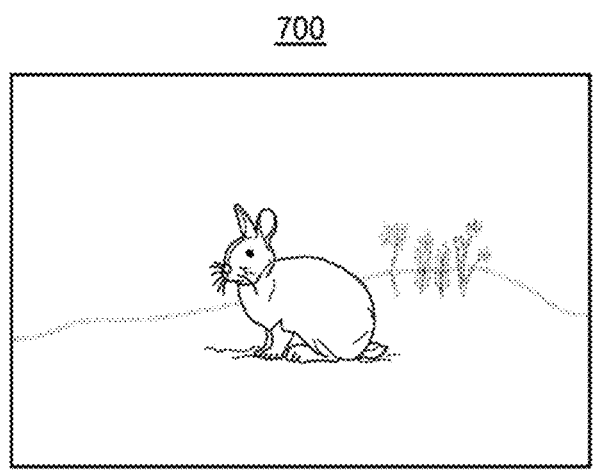
FIG. 7B illustrates an image output by performing auto zoom according to some example embodiments of the inventive concepts.

FIG. 7A is a flowchart illustrating a method of performing auto zoom according to some example embodiments of the inventive concepts, and FIG. 7B illustrates an image output by performing auto zoom according to some example embodiments of the inventive concepts. The operations of the method shown in FIG. 7A may each be implemented by any one or more of the devices, modules, units, or the like, and/or any portions thereof, according to any of the example embodiments. For example, processing circuitry configured to implement any one or more of the devices, modules, units, or the like, and/or any portions thereof, according to any of the example embodiments may be configured to implement any of operations of the method shown in FIG. 7A.

Referring to FIG. 7A, after receiving a depth map 700 (refer to FIG. 3B) from the image sensor 104, a method for performing auto zoom corresponding to the operations S412 to S422 of FIG. 4 is described in detail.

In operation S702, the auto zoom module 130 may calculate a first outer point and a second outer point based on the object of the sampled first image using the received depth map 700 (e.g., depth map information). In operation S704, the auto zoom module 130 may set a first area using the first outer point and the second outer point. The operations S702 to S704 are as described in the description of FIG. 6A. The auto zoom module 130, in operation S706, may calculate a third outer point and a fourth outer point based on components of the coordinates corresponding to the first outer point and the second outer point, and in operation S708, may set a second area using the third and fourth outer points and thus may set the second area depending on a particular ratio and on the first and second outer points. For example, the auto zoom module 130 may, in operation S706-S708, set the second area depending on a particular ratio that is determined based on the first outer point and the second outer point. The operations S706 to S708 are as described in the description of FIG. 6B.

In operation S710, after generating a second image corresponding to the second area, the size of the second area and the size of the first image are compared to determine whether the size of the second area is smaller than the size of the first image. When the size of the second area is the same as the size of the first image or is larger than the size of the first image, because there is no need to perform auto zoom, the process is terminated. When the size of the second area is smaller than the size of the first image (e.g., in response to a determination that the second area is smaller than an area of the first image), the auto zoom module 130 may calculate a zoom ratio based on the first area and the second area (e.g., corresponding to a size of the second area), and may calculate an analog zoom parameter for zooming based on the object on the first image.

In some example embodiments, the zoom may be divided into analog zoom or digital zoom depending on the configuration and settings of the electronic device. The analog zoom may mean optical zoom in which an image is physically enlarged and reduced by moving an optical lens back and forth. When analog zoom is applied, for example, the auto zoom module 130 may calculate an analog zoom parameter for moving the lens based on the auto zoom information including zoom position and direction, and distance information between the image sensor and the object in operation S712, and transmit the calculated parameter to the camera module 110 (or the actuator 106) in operation S714. In operation S716, the auto zoom module 130 may perform optical zoom for controlling the movement of the lens based on the analog zoom parameter.

The digital zoom may refer to a method of expanding or reducing a digital image displayed by the image sensor 104 through digital signaling. When digital zoom is applied, for example, the auto zoom module 130 may calculate a digital zoom parameter for enlarging the first image based on the auto zoom information (e.g., auto zoom parameter) including the center position which is the reference of zoom on the first image and the zoom ratio in operation S718, and may transmit the calculated parameter to the image sensor 104 in operation S720. In operation S722, the auto zoom module 130 may perform digital zoom to enlarge the first image based on the digital zoom parameter. Accordingly, the digital zoom may be performed at S722 based on enlarging the first image. The first image may be enlarged based on a zoom ratio. The zoom ratio may be determined based on the auto zoom information.

In operation S724, after performing the analog zoom or digital zoom, as an optional operation, a blur may be applied to an area other than the object. Restated, blurring may be performed on the area other than the object. In operation S726, referring to FIG. 7B, a blurred image may be generated as a final image (i.e., the second image) to be output to a user. As shown in FIG. 7A, an auto zoom information (e.g., auto zoom parameter) for a second image corresponding to the second area (e.g., generated at S726) may be calculated at S712 and/or S718 in response to a determination that the second area is smaller than the first image (S710=YES).

Figure 8A:
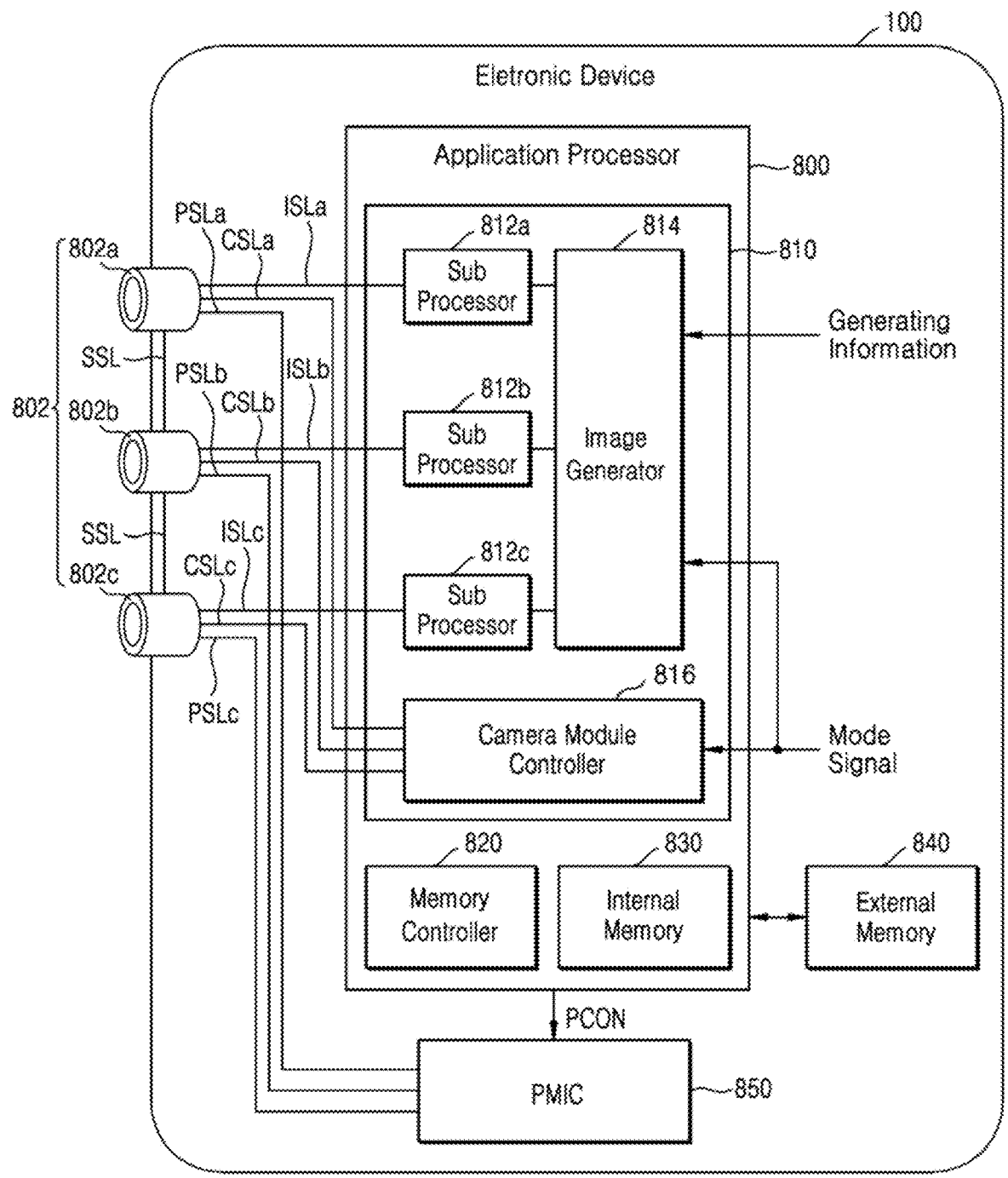
FIG. 8A is a block diagram of an electronic device including a multi-camera module according to some example embodiments of the inventive concepts.
Figure 8B:
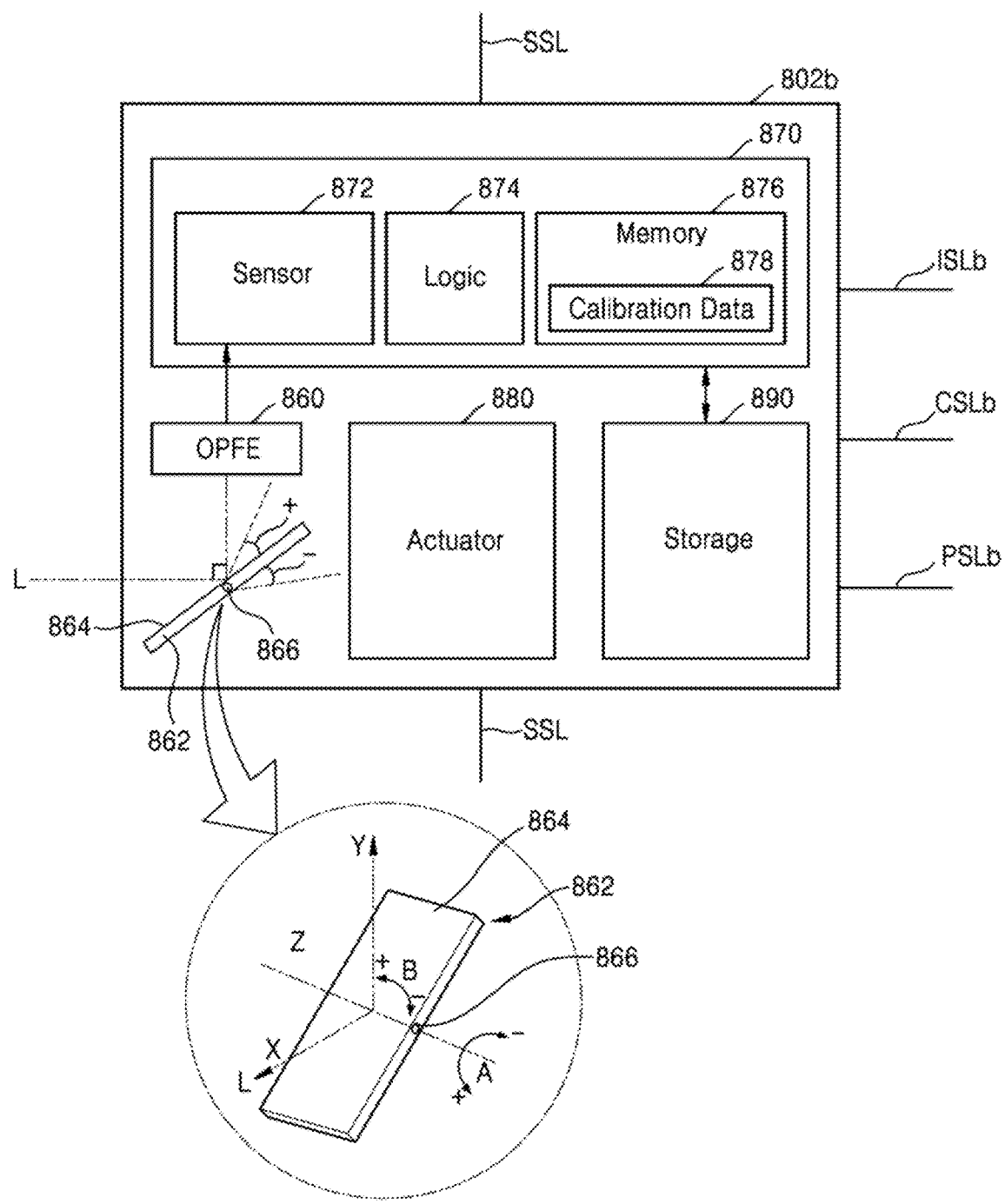
FIG. 8B is a detailed block diagram of the camera module of FIG. 8A according to some example embodiments of the inventive concepts.

FIG. 8A is a block diagram of an electronic device including a multi-camera module according to some example embodiments of the inventive concepts, and FIG. 8B is a detailed block diagram of the camera module of FIG. 8A according to some example embodiments of the inventive concepts.

Referring to FIG. 8A, the electronic device 100 may include a camera module group 802, an application processor 800, a PMIC 850, and a storage 840 (e.g., an external storage, external memory, etc.).

The camera module group 802 may include a plurality of camera modules 802a, 802b, and 802c. In some example embodiments, including the example embodiments shown in FIG. 1, the camera module 110 may be composed of a camera module group 802 including a plurality of camera modules 802a, 802b, and 802c. Although the drawing shows some example embodiments in which three camera modules 802a, 802b, and 802c are arranged, the example embodiments are not limited thereto. In some example embodiments, the camera module group 802 may include only two camera modules, or may be modified to include k (k is a natural number of 4 or more) camera modules.

Hereinafter, a detailed configuration of the camera module 802b will be described in more detail with reference to FIG. 8B, but the following description may be equally applied to other camera modules 802a and 802c according to some example embodiments.

Referring to FIG. 8B, the camera module 802b may include a prism 862, an optical path folding element (hereinafter referred to as "OPFE") 860, an actuator 880, an image sensing device 870, and a storage unit 890.

The prism 862 may include a reflective surface 864 of light reflecting material and may change the path of light L incident from the outside.

In some example embodiments, the prism 862 may change the path of the light L incident in a first direction X to a second direction Y perpendicular to the first direction X. In addition, the prism 862 rotates the reflective surface 864 of the light reflective material about the central axis 866 in the A-direction or in the B-direction so that a path of the light L incident in the first direction X may be changed to a second direction Y perpendicular to the first direction X. In this case, an OPFE 860 may also move in a third direction Z perpendicular to the first direction X and the second direction Y.

In some example embodiments, as shown, the maximum rotation angle of the prism 862 in the A direction may be 15 degrees or less in the positive (+) A direction, and greater than 15 degrees in the negative (−) A direction but, the example embodiments are not limited thereto.

In some example embodiments, the prism 862 may move in the positive (+) or negative (−) B direction by about 20 degrees, or 10 degrees to 20 degrees, or 15 degrees to 20 degrees. Here, the moving angle may be moved at the same angle in the positive (+) or minus (−) B direction, or may move to an almost similar angle within a range of 1 degree.

In some example embodiments, the prism 862 may move the reflective surface 864 of the light reflecting material in a third direction (e.g., a Z direction) parallel to the extension direction of the central axis 866.

In some example embodiments, the camera module 802b may be composed of two or more prisms, through which the path of the light L incident in the first direction X may be changed in the second direction Y perpendicular to the first direction X, and may be changed in various ways again in the first direction X or the third direction Z, and again in the second direction Y.

The OPFE 860 may include, for example, an optical lens consisting of m (here, m is a natural number) groups. The m lenses may move in the second direction Y to change an optical zoom ratio of the camera module 802b. For example, when the basic optical zoom ratio of the camera module 802b is Z, when m optical lenses included in the OPFE 860 are moved, the optical zoom ratio of the camera module 802b may be changed to an optical zoom ratio of 3Z or 5Z or 5Z or higher. In some example embodiments, the lens 102 of FIG. 1 may be configured as an OPFE 860 including m lenses, and may move based on the determined auto focus information and/or the determined auto zoom information.

The actuator 880 may move the OPFE 860 or an optical lens (hereinafter referred to as an optical lens) to a specific position. For example, the actuator 880 may adjust the position of the optical lens so that the image sensor 872 is located at a focal length of the optical lens for accurate sensing. In some example embodiments, the actuator 880 may receive a control signal for transmitting the calculated auto focus parameter and/or the calculated auto zoom parameter, and may control movement of the lens. It will be understood that the camera module group 802 may include at least one lens (e.g., OPFE 860) and an actuator 880 (e.g., servomotor) configured to control a movement of the at least one lens based on auto zoom information (e.g., an auto zoom parameter), and the camera module group 802 may be configured to cause the actuator 880 to move the at least one lens based on the auto zoom parameter being received from the application processor 800 (e.g., processing circuitry implementing the application processor 800).

The image sensing device 870 may include an image sensor 872, a control logic 874, and a memory 876.

The image sensor 872 may sense an image of a sensing target using light L provided through an optical lens. The control logic 874 may control the overall operation of the camera module 802b and process the sensed image. For example, the control logic 874 may control the operation of the camera module 802b based on a control signal provided through the control signal line CSLb, and may extract image data corresponding to a specific image (e.g., a face, arms, and legs of a person in the image) from the sensed image or perform image processing such as noise removal.

In some example embodiments, the control logic 874 may include an encoder (not shown), and may encode a sensed image or an image-processed image. The encoder may compress the image in units of pixel groups, and may compress the pixel group in the isolated area based on an HV balanced encoding method.

The memory 876 may store information used for the operation of the camera module 802b such as calibration data 878. The calibration data 878 is information required for the camera module 802b to generate image data using the light L provided from the outside, and may include, for example, information about a degree of rotation, information about a focal length, and information about an optical axis. When the camera module 802b is implemented as a multi-state camera in which the focal length is changed depending on the position of the optical lens, the calibration data 878 may include a focal length value for each position (or state) of the optical lens and information related to auto focusing.

In some example embodiments, the compressed data may be stored in the memory 876, and the first image or the second image may be compressed and stored in the memory 876. Also, the memory 876 may be used as the reference buffer of the encoder.

The storage unit 890 may store image data sensed through the image sensor 872. The storage unit 890 may be disposed outside the image sensing device 870, and may be implemented in a stacked form on a sensor chip constituting the image sensing device 870. In some example embodiments, the image sensor 872 is configured as a first chip, and the control logic 874, the storage unit 890, and the memory 876 are configured as a second chip, so that two chips may be stacked. In some example embodiments, the storage unit 890 may be implemented as an Electrically Erasable Programmable Read-Only Memory (EEPROM), but embodiments are not limited thereto.

In some example embodiments, the image sensor 872 is configured as a pixel array, and the control logic 874 may include an analog to digital converter and an image signal processing unit for processing the sensed image.

Referring to FIGS. 8A and 8B together, in some example embodiments, each of the plurality of camera modules 802a, 802b, and 802c may include an actuator 880. Accordingly, each of the plurality of camera modules 802a, 802b, and 802c may include the same or different calibration data 878 depending on the operation of the actuator 880 included therein.

In some example embodiments, one camera module (e.g., 802b) of the plurality of camera modules 802a, 802b, and 802c is a camera module in the form of a folded lens including the prism 862 and the OPFE 860 described above, and the remaining camera modules (e.g., 802a and 802c) may be a vertical type camera module that does not include the prism 862 and the OPFE 860. However, the some example embodiments are not limited thereto.

In some example embodiments, one camera module (e.g., 802c) among the plurality of camera modules 802a, 802b, and 802c may be, for example, a vertical-type depth camera that extracts depth information using infrared (IR). In this case, the application processor 800 may generate a 3D depth image by merging the image data provided from the depth camera and the image data provided from another camera module (e.g., 802a or 802b). Here, the 3D depth image corresponds to an example of the depth map shown in FIG. 3B.

In some example embodiments, at least two camera modules (e.g., 802a and 802b) among the plurality of camera modules 802a, 802b, and 802c may have different fields of view. In this case, for example, optical lenses of at least two camera modules (e.g., 802a and 802b) among the plurality of camera modules 802a, 802b, and 802c may be different from each other, but the example embodiments are not limited thereto.

Further, in some example embodiments, viewing angles of each of the plurality of camera modules 802a, 802b, and 802c may be different from each other. For example, the camera module 802a may be an ultra-wide camera, the camera module 802b may be a wide camera, and the camera module 802c may be a tele camera, but the example embodiments are not limited thereto. In this case, the optical lenses included in each of the plurality of camera modules 802a, 802b, and 802c may also be different, but the example embodiments are not limited thereto.

In some example embodiments, each of the plurality of camera modules 802a, 802b, and 802c may be disposed to be physically separated from each other. That is, the sensing area of one image sensor 872 is not divided and used by the plurality of camera modules 802a, 802b, and 802c, but an independent image sensor 872 may be disposed inside each of the plurality of camera modules 802a, 802b, and 802c.

Referring back to FIG. 8A, the application processor 800 may include an image processing device 810, a memory controller 820, and a memory 830 (e.g., an internal memory). The application processor 800 may be separated from the plurality of camera modules 802a, 802b, and 802c, and may be implemented as, for example, a separate semiconductor chip.

The image processing device 810 may include a plurality of sub-image processors 812a, 812b, and 812c, an image generator 814, and a camera module controller 816.

The image processing device 810 may include a plurality of sub-image processors 812a, 812b, and 812c corresponding to the number of camera modules 802a, 802b, and 802c.

The image data generated from the camera module 802a is provided to the sub-image processor 812a through the image signal line ISLa, the image data generated from the camera module 802b is provided to the sub-image processor 812b through the image signal line ISLb, and the image data generated from the camera module 802c may be provided to the sub-image processor 812c through the image signal line ISLc. Such image data transmission may be performed using, for example, a camera serial interface (CSI) based on a mobile industry processor interface (MIPI), but is not limited thereto.

In some example embodiments, at least one of the plurality of sub-image processors 812a, 812b, and 812c may include a decoder (not shown). The plurality of sub-image processors 812a, 812b, and 812c may include the decoder to decompress compressed image data when the corresponding camera modules 802a, 802b, and 802c include an encoder.

Meanwhile, in some example embodiments, one sub-image processor may be arranged to correspond to a plurality of camera modules. For example, the sub-image processor 812a and the sub-image processor 812c are not implemented separately from each other as shown, but are integrated and implemented as one sub-image processor, and the image data provided from the camera module 802a and the camera module 802c may be selected through a selection element (e.g., a multiplexer) and then provided to the integrated sub-image processor. In this case, the sub-image processor 812b is not integrated, and image data may be provided from the camera module 802b. In some example embodiments, at least one of the plurality of sub-image processors 812a, 812b, and 812c may include an auto focus module (not shown). The auto focus module may determine auto focus information or auto focus parameters for an object on an image received from the camera module connected to each sub-image processor by using the depth map, and the determined auto focus information or auto focus parameters may be provided to the image generator 814.

An auto focus module and an auto zoom module included in at least one of the plurality of sub-image processors 812a, 812b, and 812c may operate simultaneously.

In some example embodiments, at least one of the plurality of sub-image processors 812a, 812b, and 812c may include an auto zoom module (not shown). The auto zoom module may set a first area by calculating a first outer point and a second outer point based on an object on an image received from the camera module connected to each sub-image processor by using the depth map, set a second area based on a ratio (that may be determined based on the first area), and determine auto zoom information or auto zoom parameters by calculating a zoom ratio corresponding to the size of the second area, and the determined auto-zoom information or auto-zoom parameter may be provided to the image generator 814.

In addition, in some example embodiments, the image data generated from the camera module 802a may be provided to the sub-image processor 812a through the image signal line ISLa, the image data generated from the camera module 802b may be provided to the sub-image processor 812b through the image signal line ISLb, and the image data generated from the camera module 802c may be provided to the sub-image processor 812c through the image signal line ISLc. And, the image data processed by the sub-image processor 812b is provided directly to the image generator 814, but any one of the image data processed by the sub-image processor 812a and the image data processed by the sub-image processor 812c is selected through a selection element (e.g., a multiplexer), and then may be provided to the image generator 814.

Each of the sub-image processors 812a, 812b, and 812c may perform image processing such as bad pixel correction and 3A adjustment (auto-focus correction, auto-white balance, auto-exposure), noise reduction, sharpening, gamma control, and remosaic on image data provided from the camera modules 802a, 802b, 802c.

In some example embodiments, the remosaic signal processing may be performed in each of the camera modules 802a, 802b, and 802c and then provided to the sub-image processors 812a, 812b, and 812c.

Image data processed by each of the sub-image processors 812a, 812b, and 812c may be provided to the image generator 814. The image generator 814 may generate an output image by using image data provided from each of the sub-image processors 812a, 812b, and 812c based on image generating information or a mode signal.

In detail, the image generator 814 may generate an output image by merging at least a portion of the image data generated by the sub-image processors 812a, 812b, and 812c based on the image generation information or the mode signal. Also, the image generator 814 may generate an output image by selecting any one of the image data generated by the sub-image processors 812a, 812b, and 812c based on the image generation information or the mode signal.

In some example embodiments, the image generation information may include a zoom signal or a zoom factor. In addition, in some example embodiments, the mode signal may be, for example, a signal based on a mode selected from a user.

When the image generation information is the zoom signal and each of the camera modules 802a, 802b, and 802c has different viewing fields (viewing angles), the image generator 814 may perform different operations depending on the type of the zoom signal. For example, when the zoom signal is the first signal, an output image may be generated using the image data output from the sub-image processor 812a among the image data output from the sub-image processor 812a and the image data output from the sub-image processor 812c, and the image data output from the sub-image processor 812b. When the zoom signal is a second signal different from the first signal, the image generator 814 may generate output image using the image data output from the sub-image processor 812c among the image data output from the sub-image processor 812a and the image data output from the sub-image processor 812c, and the image data output from the sub-image processor 812b. When the zoom signal is a third signal different from the first and second signals, the image generator 814 may generate an output image by selecting any one of image data output from each of the sub-image processors 812a, 812b, and 812c without performing such image data merging. However, embodiments are not limited thereto, and, if necessary, a method of processing image data may be modified and implemented.

In some example embodiments, the image processing device 810 may further include a selector (not shown) that selects outputs of the sub-image processors 812a, 812b, and 812c and transmits them to the image generator 814.

In this case, the selector may perform different operations depending on a zoom signal or a zoom factor. For example, when the zoom signal is the fourth signal (e.g., the zoom ratio is the first ratio), the selector may select any one of the outputs of the plurality of sub-image processors 812a, 812b, and 812c and transmit the selected one to the image generator 814.

In addition, when the zoom signal is a fifth signal different from the fourth signal (e.g., the zoom ratio is the second ratio), p (p is a natural number greater than or equal to 2) outputs among the outputs of the plurality of sub-image processors 812a, 812b, and 812c may be sequentially transmitted to the image generator 814 For example, the selector may sequentially transmit the outputs of the sub-image processor 812b and the sub-image processor 812c to the image generator 814. In addition, the selection unit may sequentially transmit the outputs of the sub image processors 812a and 812b to the image generator 814. The image generator 814 may generate one output image by merging the p outputs sequentially provided.

Here, image processing such as demosaic, down-scaling to a video/preview resolution size, gamma correction, and high dynamic range (HDR) processing is performed in advance by a plurality of sub-image processors 812a and 812b, and 812c, and then the processed image data is transmitted to the image generator 814. Accordingly, even if the processed image data is provided to the image generator 814 as one signal line through the selection unit, the image merging operation of the image generator 814 may be performed at high speed.

In some example embodiments, the image generator 814 may generate merged image data with an increased dynamic range by receiving a plurality of image data having different exposure times from at least one of the plurality of sub-image processors 812a, 812b, and 812c, and performing high dynamic range (HDR) processing on the plurality of image data.

The camera module controller 816 may provide a control signal to each of the camera modules 802a, 802b, and 802c. The control signal generated from the camera module controller 816 may be provided to the corresponding camera modules 802a, 802b, and 802c through control signal lines CSLa, CSLb, and CSLc separated from each other.

Any one of the plurality of camera modules 802a, 802b, and 802c is designated as a master camera module (e.g., 802b) based on image generation information or a mode signal including a zoom signal, and the remaining camera modules (e.g., 802a and 802c) may be designated as slave cameras. Such information may be included in the control signal and provided to the corresponding camera modules 802a, 802b, and 802c through separate control signal lines CSLa, CSLb, and CSLc.

Camera modules operating as masters and slaves may be changed based on a zoom factor or an operation mode signal. For example, when the viewing angle of the camera module 802a is wider than that of the camera module 802b and the zoom factor indicates a low zoom ratio, the camera module 802a may operate as a master, and the camera module 802b may operate as a slave. Conversely, when the zoom factor indicates a high zoom ratio, the camera module 802b may operate as a master, and the camera module 802a may operate as a slave.

In some example embodiments, a control signal provided from the camera module controller 816 to each of the camera modules 802a, 802b, and 802c may include a sync enable signal. For example, when the camera module 802b is a master camera and the camera modules 802a and 802c are slave cameras, the camera module controller 816 may transmit a sync enable signal to the camera module 802b. The camera module 802b receiving the sync enable signal may generate a sync signal based on the received sync enable signal, and provide the generated sync signal to the camera modules 802a and 802c through a sync signal line SSL. The camera module 802b and the camera modules 802a and 802c may be synchronized with the sync signal to transmit image data to the application processor 800.

In some example embodiments, a control signal provided from the camera module controller 816 to the plurality of camera modules 802a, 802b, and 802c may include mode information depending on the mode signal. Based on this mode information, the plurality of camera modules 802a, 802b, and 802c may operate in a first operation mode and a second operation mode in relation to a sensing speed.

The plurality of camera modules 802a, 802b, and 802c may generate an image signal (e.g., generate an image signal at a first frame rate) at a first speed in a first operation mode, encode the generated image signal at a second speed higher than the first speed (e.g., encode an image signal at a second frame rate higher than the first frame rate), and transmit the encoded image signal to the application processor 800. In this case, the second speed may be 30 times or less of the first speed.

The application processor 800 may store the received image signal, that is, the encoded image signal, in the memory 830 provided therein or the storage 840 outside the application processor 800, and then read and decode the encoded image signal from the memory 830 or the storage 840, and display image data generated based on the decoded image signal. For example, a corresponding sub-image processor among a plurality of sub-image processors 812a, 812b, and 812c of the image processing device 810 may perform decoding, and may also perform image processing on the decoded image signal.

In the second operation mode, the plurality of camera modules 802a, 802b, and 802c may generate an image signal at a third speed lower than the first speed (e.g., generate an image signal at a third frame rate lower than the first frame rate) and transmit the image signal to the application processor 800. The image signal provided to the application processor 800 may be an unencoded signal. The application processor 800 may perform image processing on the received image signal or may store the image signal in the memory 830 or the storage 840.

The PMIC 850 may supply power, such as a power voltage, to each of the plurality of camera modules 802a, 802b, and 802c. For example, the PMIC 850 may supply a first power to the camera module 802a through a power signal line PSLa under the control of the application processor 800, supply a second power to the camera module 802b through a power signal line PSLb, and supply a third power to the camera module 802c through a power signal line PSLc.

The PMIC 850 may generate power corresponding to each of the plurality of camera modules 802a, 802b, and 802c in response to a power control signal PCON from the application processor 800, and may also adjust a power level. The power control signal PCON may include a power adjustment signal for each operation mode of the plurality of camera modules 802a, 802b, and 802c. For example, the operation mode may include a low power mode, and in this case, the power control signal PCON may include information about a camera module operating in the low power mode and a set power level. Levels of powers provided to each of the plurality of camera modules 802a, 802b, and 802c may be the same or different from each other. Also, the level of power may be dynamically changed.

Figure 9:
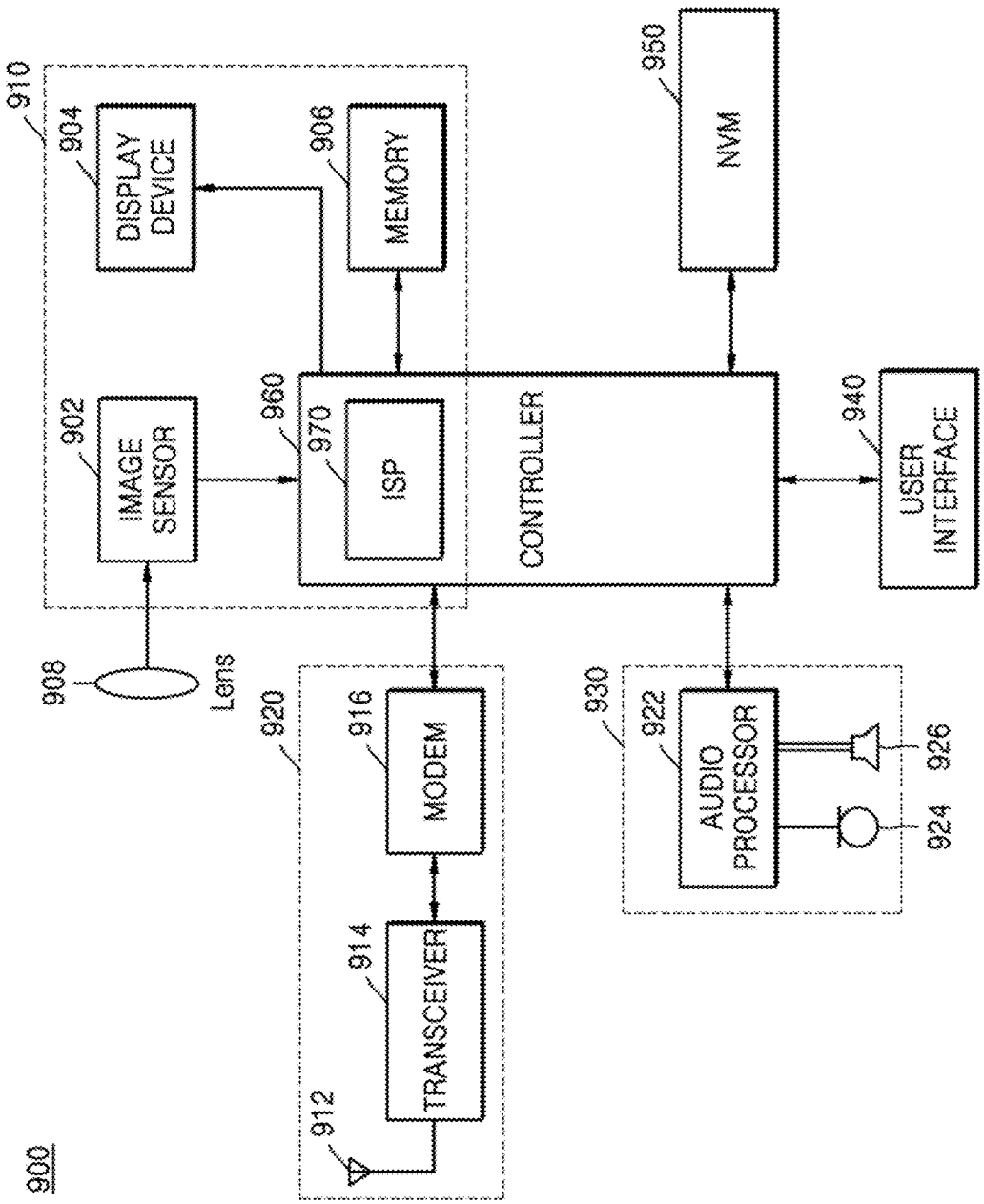
FIG. 9 is a block diagram illustrating a portable terminal according to some example embodiments of the inventive concepts.

FIG. 9 is a block diagram illustrating a portable terminal according to some example embodiments of the inventive concepts.

Referring to FIG. 9, a portable terminal 900 may correspond to the electronic device 100 according to some example embodiments of the inventive concepts, and include an image processor 910, a wireless transceiver 920, an audio processing unit 930, a user interface 940, a nonvolatile memory device 950, and a controller 960.

The image processor 910 may include a lens 908, an image sensor 902, a display device 904, a memory 906, and an image signal processor 970. As shown in some example embodiments, including the example embodiments shown in FIG. 9, the image signal processor 970 may be implemented as a part of the controller 960.

The image signal processor 970 may generate a converted image by performing image processing on the image provided from the image sensor 902, and may store the converted image in the memory 906 or may scale the converted image to provide the scaled image to the display device 904.

The wireless transceiver 920 includes an antenna 912, a transceiver 914, and a modem 916. The audio processing unit 930 may include an audio processor 922, a microphone 924, and a speaker 926. The nonvolatile memory device 950 may be provided as a memory card (e.g., MMC, eMMC, SD, micro SD) or the like.

The user interface 940 may be implemented with various devices capable of receiving user input, such as a keyboard, a curtain key panel, a touch panel, a fingerprint sensor, and a microphone. The user interface may receive a user input and provide a signal corresponding to the received user input to the controller 960.

The controller 960 controls the overall operation of the portable terminal 900 and may be provided as a system-on-chip (SoC) that drives an application program, an operating system, and the like. The kernel of the operating system driven in the system-on-chip may include an I/O scheduler and a device driver for controlling the nonvolatile memory device 950.

As described herein, any devices, electronic devices, units, modules, terminals, and/or any portions thereof according to any of the example embodiments (including without limitation the electronic device 100, camera module 110, depth information generator 108, touch screen module 206, application processor 120, image signal processor 126, auto focus module 128, auto zoom module 130, application processor 222, image signal processor 224, touch screen module 206, touch screen driving circuit 210, electronic device 500, imaging unit 504, image sensor 506, application processor 522, camera module group 802, application processor 800, PMIC 850, storage 840, sub-image processors 812a, 812b, and 812c, image generator 814, camera module controller 816, image sensing device 870, image sensor 872, control logic 874, memory 876, and/or any portion thereof) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include anontransitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, units, modules, terminals, and/or any portions thereof according to any of the example embodiments.

While the inventive concepts have been particularly shown and described with reference to example embodiments thereof, it will be understood that various changes in form and details may be made therein without departing from the spirit and scope of the following claims.

What is claimed is:
1. An apparatus, comprising:
processing circuitry configured to
receive a first image from an image sensor, determine auto focus information with respect to an object in the first image based on a distance to the object based on a depth map, set a first area based on calculating a first outer point and a second outer point associated with the object using the depth map, set a second area based on a particular ratio, the particular ratio determined based on the first outer point and the second outer point, and determine auto zoom information based on calculating a zoom ratio corresponding to a size of the second area.

2. The apparatus of claim 1, wherein the processing circuitry is configured to determine the auto focus information and determine the auto zoom information simultaneously.

3. The apparatus of claim 1, wherein the processing circuitry is further configured to generate a third image based on separating an area having a same property as a property of a pixel located in a center of the first image on the depth map, and identify the object through the third image based on using a blur characteristic.

4. The apparatus of claim 1, wherein the processing circuitry is configured to obtain sampling values of the object based on sampling the first image, calculate the first outer point based on a minimum value of an x-axis component among the sampling values and a minimum value of a y-axis component among the sampling values, such that the minimum value of the x-axis component and the minimum value of the y-axis component correspond to components of coordinates of the first outer point, and calculate the second outer point based on a maximum value of the x-axis component among the sampling values and a maximum value of the y-axis component among the sampling values, such that the maximum value of the x-axis component and the maximum value of the y-axis component correspond to components of coordinates of the second outer point.

5. The apparatus of claim 1, wherein the processing circuitry is configured to calculate the particular ratio based on a three division method, the three division method performed based on the object.

6. The apparatus of claim 1, wherein the processing circuitry is configured to determine the auto zoom information based on calculating the zoom ratio corresponding to the size of the second area in response to a determination that the second area is smaller than an area of the first image.

7. The apparatus of claim 1, wherein the processing circuitry is further configured to perform blurring on an area other than the object.

8. The apparatus of claim 1, wherein the processing circuitry is further configured to set the second area by expanding the first area based on the particular ratio.

9. An image signal processing method of an image signal processor, the image signal processing method comprising:

calculating a first outer point and a second outer point based on an object in a first image using depth map information;

setting a first area based on using the first and second outer points;

determining auto zoom information to cause a second image to be output, the second image corresponding to a second area depending on a particular ratio, the particular ratio determined based on the first outer point and the second outer point; and determining auto focus information associated with the object in the first image based on a distance to the object based on the depth map information, wherein the determining of the auto zoom information and the determining of the auto focus information are performed simultaneously.

10. The image signal processing method of claim 9, further comprising:

generating the depth map information using depth information, wherein the depth information is extracted from a depth information generator including at least one of a phase detection auto focus (PDAF) sensor, a time of flight (TOF) sensor, or a light detection and ranging (LiDAR) sensor.

11. The image signal processing method of claim 9, further comprising:

separating an area having a same property of the depth map information as a property of a pixel located in a center of the first image; and identifying the object in the area using a blur characteristic.

12. The image signal processing method of claim 10, wherein the calculating of the first outer point and the second outer point includes:

obtaining sampling values of the object based on sampling the first image;

calculating the first outer point based on a minimum value of an x-axis component among the sampling values and a minimum value of a y-axis component among the sampling values, such that the minimum value of the x-axis component and the minimum value of the y-axis component correspond to components of coordinates corresponding to the first outer point; and calculating the second outer point based on a maximum value of the x-axis component among the sampling values and a maximum value of the y-axis component among the sampling values, such that the maximum value of the x-axis component and the maximum value of the y-axis component correspond to components of coordinates corresponding to the second outer point.

13. The image signal processing method of claim 10, wherein the determining of the auto zoom information includes calculating a third outer point having a value of 0.5 times components of coordinates corresponding to the first outer point;

calculating a fourth outer point having a value of 1.3 times components of coordinates corresponding to the second outer point; and setting the second area using the third and fourth outer points.

14. The image signal processing method of claim 10, wherein the auto zoom information includes a zoom ratio calculated based on a three division method, the three division method performed based on the object.

15. The image signal processing method of claim 10, wherein the determining of the auto zoom information is performed in response to a determination that the second image is smaller than the first image.

16. The image signal processing method of claim 10, further comprising: performing blurring on an area other than the object.

17. An image processing system, comprising:
a camera device including an image sensor configured to transmit a first image; and
processing circuitry configured to
  receive the first image from the image sensor,
  calculate an auto focus parameter for an object in the first image based on a distance to the object based on a depth map,
  set a first square based on the object included in the first image using the depth map,
  set a second square based on a ratio, the ratio determined based on the first square, and
  calculate an auto zoom parameter for a second image corresponding to the second square in response to a determination that the second square is smaller than the first image.

18. The image processing system of claim 17, wherein the processing circuitry is configured to calculate the auto focus parameter and the auto zoom parameter simultaneously.

19. The image processing system of claim 17, wherein the camera device includes
  at least one lens, and
  an actuator configured to control a movement of the at least one lens based on the auto zoom parameter, and
  the camera device is configured to perform optical zoom based on causing the actuator to move the at least one lens according to the auto zoom parameter received from the processing circuitry.

20. The image processing system of claim 17, wherein the processing circuitry is configured to perform digital zoom based on enlarging the first image according to a zoom ratio, the zoom ratio determined based on the auto zoom parameter.

\* \* \* \* \*